US009927510B2

(12) United States Patent
Waldron et al.

(10) Patent No.: US 9,927,510 B2
(45) Date of Patent: Mar. 27, 2018

(54) STAR TRACKER

(71) Applicant: The Charles Stark Draper Laboratory, Inc., Cambridge, MA (US)

(72) Inventors: Erik L. Waldron, Concord, MA (US); Juha-Pekka J. Laine, Boston, MA (US); Gregory P. Blasche, Burlington, MA (US); Murali V. Chaparala, Newton, MA (US); Robin Mark Adrian Dawson, Waltham, MA (US); Benjamin F. Lane, Grafton, MA (US); Stephen P. Smith, Acton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 279 days.

(21) Appl. No.: 14/819,649

(22) Filed: Aug. 6, 2015

(65) Prior Publication Data
US 2016/0041265 A1 Feb. 11, 2016

Related U.S. Application Data

(60) Provisional application No. 62/033,961, filed on Aug. 6, 2014.

(51) Int. Cl.
*G01C 21/02* (2006.01)
*G01S 3/786* (2006.01)
*G01C 3/08* (2006.01)

(52) U.S. Cl.
CPC ............ *G01S 3/7867* (2013.01); *G01C 3/085* (2013.01)

(58) Field of Classification Search
CPC ............................. G01S 3/7867; G01C 3/085

USPC ....... 250/203.6; 348/135, 139–140, 169–171
See application file for complete search history.

(56) References Cited

U.S. PATENT DOCUMENTS

| | | | | | |
|---|---|---|---|---|---|
| 5,206,499 A | * | 4/1993 | Mantravadi | ........... | G01S 3/7867 250/203.6 |
| 5,227,619 A | * | 7/1993 | Vilaire | .................... | G01S 3/784 250/203.3 |
| 5,448,053 A | * | 9/1995 | Rhoads | .................. | G02B 26/06 250/201.9 |

(Continued)

FOREIGN PATENT DOCUMENTS

WO    WO 9711882 A2 *   4/1997  ............. B64G 1/361

OTHER PUBLICATIONS

Cao, et al., "Resonant Germanium Nanoantenna Photodetectors," Nano Letters, vol. 10, pp. 1229-1233, 2010.

(Continued)

*Primary Examiner* — Thanh Luu
*Assistant Examiner* — Kevin Wyatt
(74) *Attorney, Agent, or Firm* — Sunstein Kann Murphy & Timbers LLP

(57) ABSTRACT

A star tracker determines a location or orientation of an object, such as a space vehicle, by observing unpolarized light from one or more stars or other relatively bright navigational marks, without imaging optics, pixelated imaging sensors or associated pixel readout electronics. An angle of incidence of the light is determined by comparing signals from two or more differently polarized optical sensors. The star tracker may be fabricated on a thin substrate. Some embodiments have vertical profiles of essentially just their optical sensors. Some embodiments include micro-baffles to limit field of view of the optical sensors.

21 Claims, 16 Drawing Sheets

(56) References Cited

U.S. PATENT DOCUMENTS

| | | | |
|---|---|---|---|
| 6,252,627 B1* | 6/2001 | Frame | H04N 3/1562 348/311 |
| 9,073,648 B2* | 7/2015 | Tsao | B64G 1/36 |
| 2013/0010106 A1* | 1/2013 | Yokota | G01C 3/085 348/135 |
| 2014/0267641 A1 | 9/2014 | Laine et al. | 348/61 |
| 2014/0267755 A1 | 9/2014 | Laine et al. | 348/162 |

OTHER PUBLICATIONS

Cartwright, "B-mode polarization spotted in cosmic microwave Background," http://physicsworld.com/cws/article/news/2013/jul/25/b-mode-polarization-spotted-in-cosmic-microwave-background, 3 Pages, Jul. 25, 2013.

Chu, et al., "Design of a Novel Polarization Sensor for Navigation," Proceedings of the 2007 IEEE International Conference on Mechatronics and Automation, 6 Pages, Aug. 5-8, 2007.

Chu, et al., "Application of a Novel Polarization Sensor to Mobile Robot Navigation," Proceedings of the 2009 IEEE International Conference on Mechatronics and Automation, 6 Pages, Aug. 9-12, 2009.

DePoy, "The Magnitude Scale—Measuring the brightness of astronomical objects," 35 Pages, Sep. 8, 2010.

Farkas, et al., "Accuracy of sun localization in the second step of sky-polarimetric Viking navigation for north determination: a planetarium experiment," Journal of the Optical Society of America, vol. 31, No. 7, 12 Pages, Jul. 2014.

Fosalba, et al., "Dust Polarization From Starlight Data," arXiv:astro-ph/0111253v1, 7 Pages, Nov. 13, 2001.

Lodén, "A study of possible variations in the polarization of starlight," Arkiv for Astronomi, Band 4, No. 22, 17 Pages, Oct. 26, 1966.

Mühlschlegel, et al., "Resonant Optical Antennas," Science, vol. 308, 3 Pages, Jun. 10, 2005.

Sarkar, et al., "Navigation Using CMOS Polarization Sensor," Springer, vol. 461, pp. 185-214, 2013 [Abstract].

Schuller, et al. "Plasmonics for extreme light concentration and manipulation," Nature Materials, vol. 9, pp. 193-204, Mar. 2010.

Tanemura, et al., "Multiple-Wavelength Focusing of Surface Plasmons with a Non-periodic Nanoslit Coupler," Nano Letters, vol. 11, 6 Pages, 2011.

Tang, et al., "Nanometre-scale germanium photodetector enhanced by a near-infrared dipole antenna," Nature Photonics, vol. 2, pp. 226-229, 2008 [Abstract].

Wikipedia, "Cosmic microwave background," https://en.wikipedia.org/w/index.php?title=Cosmic_microwave_background&oldid=566944072, 14 Pages, Aug. 3, 2013.

Wikipedia, "Nantenna," https://en.wikipedia.org/w/index.php?title=Nantenna&oldid=558319800, 7 Pages, Jun. 4, 2013.

Wikipedia, "Polarization in astronomy," https://en.wikipedia.org/w/index.php?title=Polarization_in_astronomy&oldid=543992427, 2 Pages, Mar. 14, 2013.

Wikipedia, "Rectenna," https://en.wikipedia.org/w/index.php?title=Rectenna&oldid=560627000, 3 Pages, Jun. 19, 2013.

* cited by examiner

STAR TRACKER

CROSS REFERENCE TO RELATED APPLICATIONS

This application claims the benefit of U.S. Provisional Patent Application No. 62/033,961, filed Aug. 6, 2014, titled "Star Tracker," the entire contents of which are hereby incorporated by reference herein, for all purposes.

TECHNICAL FIELD

The present invention relates to star trackers and, more particularly, to star trackers having polarized sensors, rather than imaging optics.

BACKGROUND ART

Most artificial satellites, spacecraft and other craft such as aircraft, ship and ground vehicles (collectively referred to herein as vehicles) require information about their locations and/or attitudes to accomplish their missions. This information may be obtained from one or more sources, such as the global positioning system (GPS), ground-based radar tracking stations and/or on-board star trackers.

A star tracker is an optical device that measures angles to one or more stars, as viewed from a vehicle. A star tracker typically includes a star catalog that lists bright navigational stars and information about their locations in the sky, sufficient to calculate a location of a vehicle in space, given bearings to one or more of the stars. A conventional star tracker includes a lens that projects an image of a star onto a photocell, or that projects an image of one or more stars onto a pixelated light-sensitive sensor array (collectively, a digital camera). The lens typically constitutes a large fraction of the mass of the star tracker. The digital camera also typically constitutes a large fraction of the electronics of the star tracker, and it consumes a significant fraction of the electrical power consumed by the star tracker.

One type of star tracker is "strapped-down," meaning its view angle, relative to its vehicle, is fixed. Another type of star tracker can be aimed mechanically, such as in a direction in which a navigational star is expected to be seen. Using data from the photocell or sensor array, the star catalog and information about the star tracker's view angle, relative to the vehicle, the star tracker calculates a position of the vehicle in space.

Strap-down star trackers are mechanically simpler than mechanically aimable (gimbaled) star trackers. However, the fixed view angle of a strap-down star tracker limits the number of navigational stars that may be used. Mechanically aimable star trackers can use a larger number of navigational stars. However, aiming a star tracker, relative to its vehicle, with the required precision, poses substantial problems.

An ideal star tracker would be mechanically, electrically and optically simple, small, low in mass and consume little power.

Jinkui Chu, et al., describe a polarization-based navigation system for a mobile robot (Design of a Novel Polarization Sensor for Navigation, Proceedings of the 2007 IEEE International Conference on Mechatronics and Automation, Aug. 5-8, 2007, pp. 3161-3166, Harbin, China and Application of a Novel Polarization Sensor to Mobile Robot Navigation, Proceedings of the 2009 IEEE International Conference on Mechatronics and Automation, Aug. 9-12, 2009, pp. 3763-3768, Changchun, China). However, the Chu device requires incoming light to be at least fairly strongly polarized. Rayleigh scattering of sunlight in the atmosphere causes polarization patters in the sky, as observed from earth. The Chu device is designed to operate on earth by observing these polarization patters. Star light is essentially unpolarized, or only very slightly polarized. The Chu device is, therefore, not useful as a star tracker, particularly in space.

SUMMARY OF EMBODIMENTS

An embodiment of the present invention provides a method for determining a direction to a source of unpolarized electromagnetic radiation. The method includes exposing a first sensor to the unpolarized electromagnetic radiation. The first sensor is primarily sensitive to electromagnetic radiation polarized along a first axis. The first sensor is configured to generate a first signal proportional to a magnitude of the unpolarized electromagnetic radiation detected by the first sensor. The method also includes exposing a second sensor to the unpolarized electromagnetic radiation. The second sensor is primarily sensitive to electromagnetic radiation polarized along a second axis. The second axis is different than the first axis. The second sensor is configured to generate a second signal proportional to a magnitude of the unpolarized electromagnetic radiation detected by the second sensor. The method also includes determining a ratio of the first signal to the second signal. An angle of incidence of the unpolarized electromagnetic radiation is calculated using the ratio.

Exposing the first and second sensors to the unpolarized electromagnetic radiation may include exposing the first and second sensors to unpolarized electromagnetic radiation from a star.

A database that stores a star catalog may be automatically accessed. A location in space may be automatically calculated, based at least in part on the angle of incidence and information in the star catalog.

A database that stores a star catalog may be automatically accessed. A direction to a star and identity of the star may be automatically calculated, based at least in part on the angle of incidence and information in the star catalog.

Exposing the first sensor to the unpolarized electromagnetic radiation may include exposing a first array of nanoantennas to the unpolarized electromagnetic radiation. All nanoantennas of the first array of nanoantennas may be similarly oriented, so as to be primarily sensitive to electromagnetic radiation polarized along the first axis. All the nanoantennas of the first array of nanoantennas may be electrically coupled together to generate the first signal. Exposing the second sensor to the unpolarized electromagnetic radiation may include exposing a second array of nanoantennas to the unpolarized electromagnetic radiation. All nanoantennas of the second array of nanoantennas may be similarly oriented, so as to be primarily sensitive to electromagnetic radiation polarized along the second axis. All the nanoantennas of the second array of nanoantennas may be electrically coupled together to generate the second signal.

The method may also include storing a value representing the second signal and tilting the second sensor. The tilted second sensor may be exposed to the unpolarized electromagnetic radiation. A third signal may be generated proportional to a magnitude of the unpolarized electromagnetic radiation detected by the tilted second sensor. Determining the ratio of the first signal to the second signal and using the ratio to calculate the angle of incidence of the unpolarized electromagnetic radiation may include using the first signal, the stored value representing the second signal and the third signal to calculate the angle of incidence of the unpolarized electromagnetic radiation.

The method may include compensating for a degree to which the unpolarized electromagnetic radiation is polarized.

Sensing the electromagnetic radiation may include providing a sensor that includes a plurality of elements. Each element of the plurality of elements may be configured to generate a signal proportional to electromagnetic radiation incident upon the element. Sensitivity of at least one element of the plurality of elements may be automatically adjusted, such that each element of the plurality of elements is preferentially sensitive to incident electromagnetic radiation having a respective polarization, wherein at least two elements of the plurality of elements are preferentially sensitive to different polarizations. Determining the polarization direction of the electromagnetic radiation may include calculating a ratio of signals generated by the at least two elements of the plurality of elements.

Exposing the first sensor may include providing a sensor that includes a plurality of first elements. Each element of the plurality of first elements may be configured to generate a signal proportional to electromagnetic radiation incident upon the element. Exposing the second sensor may include providing a sensor comprising a plurality of second elements. Each element of the plurality of second elements may be configured to generate a signal proportional to electromagnetic radiation incident upon the element. The method may further include automatically adjusting sensitivity of the plurality of first elements, such that each element of the plurality of first elements is preferentially sensitive to incident electromagnetic radiation having a first polarization. The sensitivity of the plurality of second elements may be automatically adjusted, such that each element of the plurality of second elements is preferentially sensitive to incident electromagnetic radiation having a second polarization. The second polarization may be different than the first polarization.

Automatically adjusting the sensitivity of the at least one element of the plurality of elements may include automatically adjusting the sensitivity of the at least one element, such that the at least two elements of the plurality of elements are preferentially sensitive to mutually perpendicular polarizations.

Automatically adjusting the sensitivity of the plurality of first elements and the plurality of second elements may include automatically adjusting the sensitivity of the plurality of first elements and automatically adjusting the sensitivity of the plurality of second elements, such that the first polarization is at least approximately perpendicular to the second polarization.

Another embodiment of the present invention provides a star tracker for determining a direction to a source of unpolarized electromagnetic radiation. The star tracker includes a plurality of electromagnetic radiation sensors. Each sensor of the plurality of electromagnetic radiation sensors is primarily sensitive to electromagnetic radiation polarized along a different axis. Each sensor generates a signal (a "proportional signal") in proportion to a magnitude of unpolarized electromagnetic radiation detected by the sensor. The star tracker also includes a ratio detector. The ratio detector receives the proportional signals generated by the plurality of electromagnetic radiation sensors. The ratio detector generates a signal (a "ratio signal") that represents a ratio of at least two of the proportional signals. The star tracker also includes an angle of incidence calculator. The angle of incidence calculator receives the ratio signal and generates therefrom a signal representing an angle of incidence of the unpolarized electromagnetic radiation.

The star tracker may also include a database that stores a star catalog. The star tracker may also include a navigation calculator that receives the angle of incidence signal. The navigation calculator accesses the star catalog and calculates an orientation or location in space, based at least in part on the angle of incidence signal and information in the star catalog.

The star catalog may include information about a degree of polarization of light or other electromagnetic radiation from at least one star. The ratio detector and/or the incidence angle calculator uses the information about the degree of polarization of the light or other electromagnetic radiation from the at least one star to compensate the ratio signal and/or the signal representing an angle of incidence.

Each sensor of the plurality of electromagnetic radiation sensors may include an array of similarly oriented nanoantennas. All the nanoantennas may be oriented so as to be primarily sensitive to electromagnetic radiation polarized along the axis of the sensor. All the nano antennas may be electrically coupled together to generate the proportional signal for the sensor.

At least one sensor (a "tiltable sensor") of the plurality of electromagnetic radiation sensors may be tiltable. The star tracker may also include a motor mechanically coupled to the at least one tiltable sensor, so as to tilt the at least one sensor from a first plane to a second plane. The at least one tiltable sensor generates at least a first portion of the proportional signal, based on a magnitude of unpolarized electromagnetic radiation detected by the at least one tiltable sensor while the at least one tiltable sensor is in the first plane. The at least one tiltable sensor generates a second portion of the proportional signal, based on a magnitude of unpolarized electromagnetic radiation detected by the at least one tiltable sensor while the at least one tiltable sensor is in the second plane. The ratio detector generates at least a first portion of the ratio signal based on the first portion of the proportional signal. The ratio detector generates at least a second portion of the ratio signal based on the second portion of the proportional signal.

Yet another embodiment of the present invention provides a computer program product for determining a direction to a source of unpolarized electromagnetic radiation. The computer program product includes a non-transitory computer-readable medium having computer readable program code stored thereon. When executed by a processor, the computer readable program code causes the processor to receive a first signal from a first sensor. The first sensor is exposed to the unpolarized electromagnetic radiation. The first sensor is primarily sensitive to electromagnetic radiation polarized along a first axis. The first sensor is configured to generate the first signal proportional to a magnitude of the unpolarized electromagnetic radiation detected by the first sensor. The computer readable program code is also configured to cause the processor to receive a second signal from a second sensor. The second sensor is exposed to the unpolarized electromagnetic radiation. The second sensor is primarily sensitive to electromagnetic radiation polarized along a second axis. The second axis is different than the first axis. The second sensor is configured to generate the second signal proportional to a magnitude of the unpolarized electromagnetic radiation detected by the second sensor. The computer readable program code is configured to cause the processor to determine a ratio of the first signal to the second signal. The computer readable program code is configured to cause the processor to use the ratio to calculate an angle of incidence of the unpolarized electromagnetic radiation.

The computer readable program code may also cause a processor to automatically access a database that stores a star catalog and automatically calculate a location in space based at least in part on the angle of incidence and information in the star catalog.

The first sensor may be exposed to the unpolarized electromagnetic radiation by exposing a first array of nanoantennas to the unpolarized electromagnetic radiation. All nanoantennas of the first array of nanoantennas may be similarly oriented, so as to be primarily sensitive to electromagnetic radiation polarized along the first axis. All the nanoantennas of the first array of nanoantennas may be electrically coupled together to generate the first signal. The second sensor may be exposed to the unpolarized electromagnetic radiation by exposing a second array of nanoantennas to the unpolarized electromagnetic radiation. All nanoantennas of the second array of nanoantennas may be similarly oriented, so as to be primarily sensitive to electromagnetic radiation polarized along the second axis. All the nanoantennas of the second array of nanoantennas may be electrically coupled together to generate the second signal.

The computer readable program code may also cause the processor to store a value representing the second signal. The computer readable program code may also cause the processor to tilt the second sensor and expose the tilted second sensor to the unpolarized electromagnetic radiation. The computer readable program code may also cause the processor to generate a third signal proportional to a magnitude of the unpolarized electromagnetic radiation detected by the tilted second sensor. Determining the ratio of the first signal to the second signal and using the ratio to calculate the angle of incidence of the unpolarized electromagnetic radiation may include using the first signal, the stored value representing the second signal and the third signal to calculate the angle of incidence of the unpolarized electromagnetic radiation.

The computer readable program code may also cause the processor to compensate for a degree to which the unpolarized electromagnetic radiation is polarized.

An embodiment of the present invention provides a star tracker for determining a direction to a source of unpolarized electromagnetic radiation. The star tracker includes a first electromagnetic radiation sensor. The first electromagnetic radiation sensor is configured to generate a first signal proportional to a first polarization component of unpolarized electromagnetic radiation impinging on the first electromagnetic radiation sensor. The star tracker also includes a second electromagnetic radiation sensor. The second electromagnetic radiation sensor is configured to generate a second signal proportional to a second polarization component of unpolarized electromagnetic radiation impinging on the second electromagnetic radiation sensor. The second polarization component is oriented differently than the first polarization component. The star tracker also includes a ratio detector. The ratio detector receives the first and second signals. The ratio detector generates a ratio signal that represents a ratio of first signal to the second signal. The star tracker also includes an angle of incidence calculator. The angle of incidence calculator receives the ratio signal and generates therefrom a signal representing an angle of incidence of the unpolarized electromagnetic radiation.

Another embodiment of the present invention provides a star tracker that includes a plurality of electromagnetic radiation sensors. Each sensor of the plurality of electromagnetic radiation sensors is configured to generate a respective signal in proportion to magnitude of a different polarization component of unpolarized electromagnetic radiation impinging on the sensor. The star tracker also includes a ratio detector. The ratio detector is configured to receive the signals generated by the plurality of electromagnetic radiation sensors. The ratio detector is configured to calculate an angle of incidence of the unpolarized electromagnetic radiation.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

In accordance with embodiments of the present invention, methods and apparatus are disclosed for determining a location or orientation of an object, such as a vehicle, by observing light from one or more stars or other relatively bright navigational marks, without imaging optics. Thus, these embodiments can be smaller and lighter than conventional star trackers. These embodiments do not require power-hungry pixelated imaging sensors and associated pixel readout electronics. Some embodiments have vertical profiles of essentially just their optical sensors. Embodiments of the present invention measure angles of incidence of light, relative to optical sensors, by comparing signals from two or more differently polarized optical sensors. The embodiments do not, however, require the light to be polarized.

Figure 1:
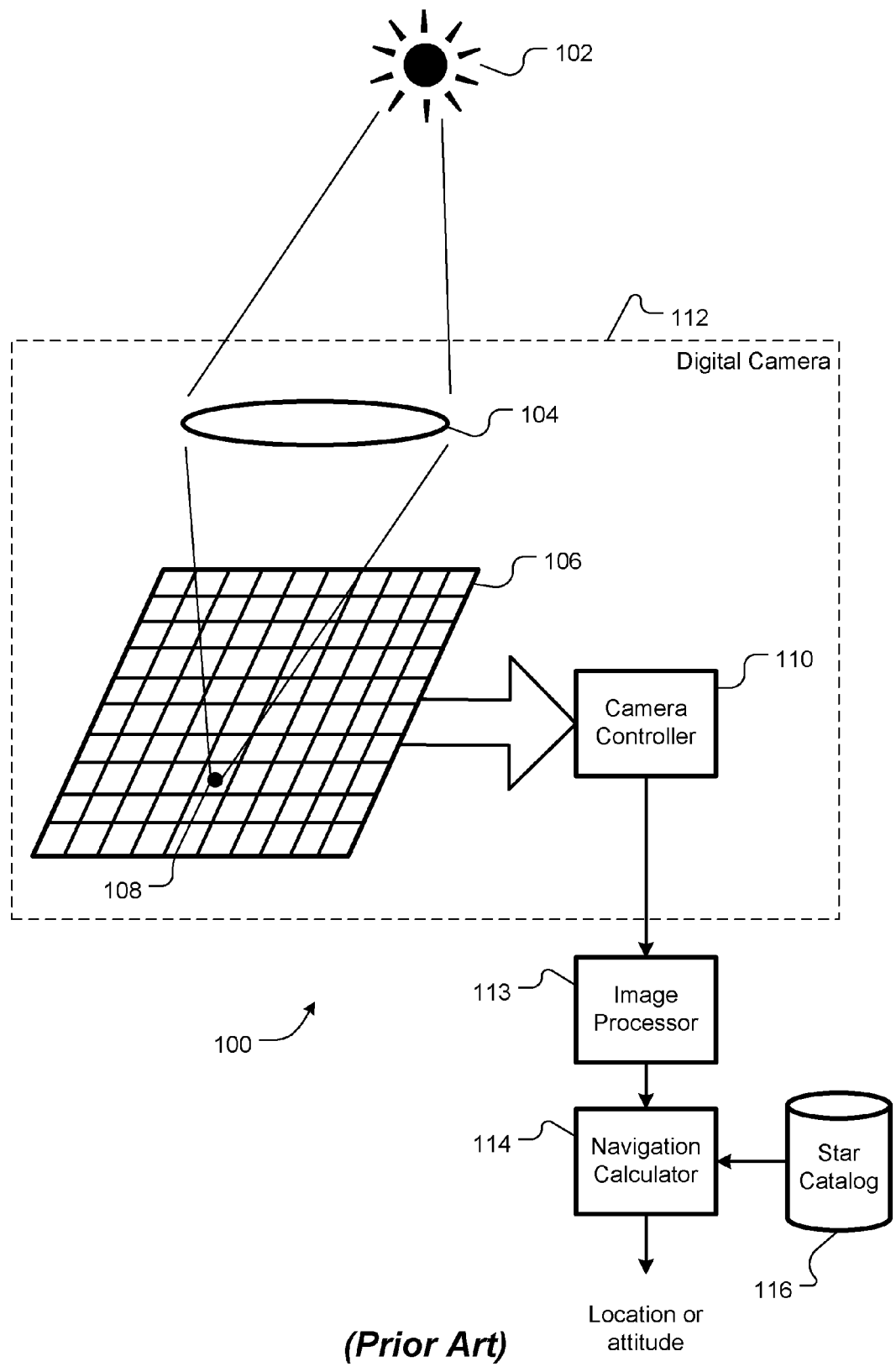
FIG. 1 is a schematic diagram of a star tracker, according to the prior art.

FIG. 1 is a schematic diagram of a star tracker 100, according to the prior art. Light from a star 102 is focused by a lens 104 onto a pixelated image sensor 106. In some cases, the focused image occupies a single pixel, as indicated at 108. In other cases, the focused image occupies several adjacent pixels. A camera controller 110 reads data from the pixels of the image sensor 106 to generate digital image data. Collectively, the lens 104, the images sensor 106 and the camera controller 110 form a digital camera 112.

An image processor 113 then analyzes the image data to determine a centroid location of the star image on the image sensor 106. In some cases, more than one star is imaged, in which case the image processor 113 determines centroid locations for each of the star images. From the location(s) of the centroid(s), typically relative to the center of the image, the image processor 113 calculates angles to each imaged star.

A star catalog 116 stores information about selected navigational stars, such as information about their locations in the sky or information for calculating their sky locations based on time and date. The information in the star catalog 116 is sufficient to enable a navigation calculator 114 to calculate a location and/or attitude of the vehicle in space, given the relative angle(s). The prior art start tracker 100 is, therefore, sensitive to distortion of the lens 104 and to misalignment of the lens 104 with the image sensor 106. Such misalignment may occur during manufacture or result from thermal expansion and contraction in space or from vibration or other forces during launch.

Figure 2:
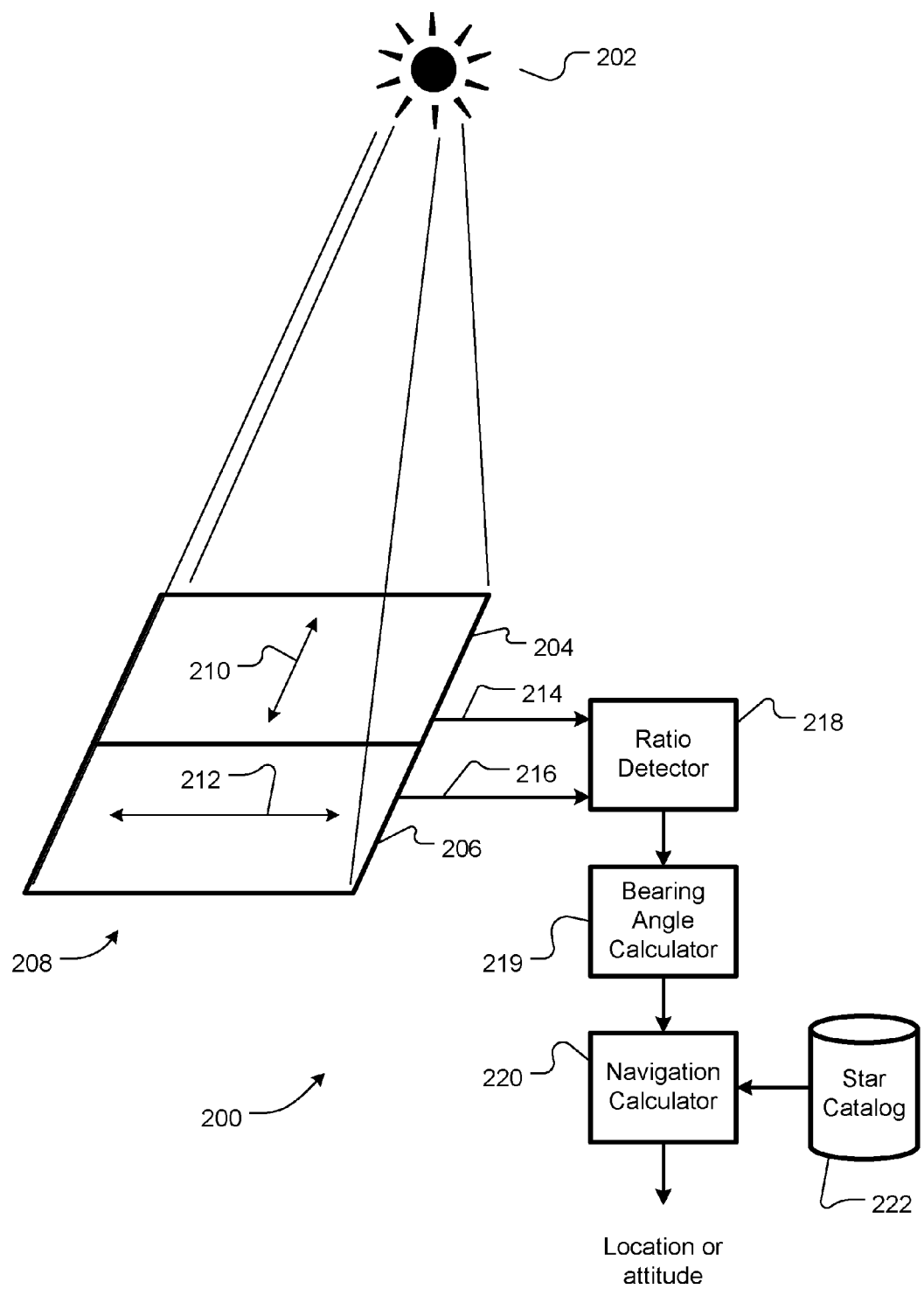
FIG. 2 is a schematic diagram of a star tracker, according to an embodiment of the present invention.

FIG. 2 is a schematic diagram of a star tracker 200, according to an embodiment of the present invention. Light from a star 202 illuminates two polarization-sensitive light sensors 204 and 206. The light from the star 202 may be within any portion of the electromagnetic spectrum that can be reliably detected by the polarization-sensitive light sensors 204 and 206, not necessarily within the visible or invisible light portions of the spectrum (about 50 nm to about 500 µm). Collectively, the two polarization-sensitive light sensors 204 and 206 are referred to herein as a "polarization sensing element" (poxel) 208. Each polarization-sensitive light sensor 204 and 206 is sensitive to light polarized along a different axis, as indicated by arrows 210 and 212, respectively. In some embodiments, the two axes 210 and 212 are mutually perpendicular. Note, however, that each polarization-sensitive light sensor 204 and 206 can, but need not, be pixelated.

Star light is essentially unpolarized or only very slightly polarized. Although integrated thermal radiation of stars is not usually appreciably polarized at source, scattering by interstellar dust can impose polarization on starlight over long distances. Net polarization at the source can occur if the photosphere itself is asymmetric, due to limb polarization. Plane polarization of starlight generated at the star itself is observed for Ap stars (peculiar A type stars). Star light observed near earth is polarized to a maximum degree of about 2%. Unless context indicates otherwise, as used herein, the term unpolarized light means light with a maximum degree of polarization of about 2%.

As described herein, a relative amount by which each of the polarization-sensitive light sensors 204 and 206 is stimulated depends largely on an angle of incidence of the light from the star 202, even with completely unpolarized light. That is, the angle of incidence determines a ratio, according to which one of the polarization-sensitive light sensors 204 is stimulated, relative to the other polarization-sensitive light sensor 206. Embodiments of the present invention do not, therefore, rely on receiving polarized light.

Each polarization-sensitive light sensor 204 and 206 generates a respective signal 214 and 216, such as a voltage, in proportion to an amount of light detected by the polarization-sensitive light sensor. A ratio detector 218 determines a ratio of the signals 214 and 216. This ratio correlates to the angle of incidence, as discussed herein. An angle calculator 219 calculates an angle of incidence of the light from the star, based on the ratio of the signals 214 and 216. A bearing angle to the star 202, relative to the polarization-sensitive light sensor 204 and 206, is equal to the angle of incidence. The bearing angle calculator 219 provides the bearing angle to a navigation calculator 220.

The navigation calculator 220 uses the bearing angle information and a star catalog 222, largely as in a conventional star tracker, to calculate a location and/or attitude of the star tracker and/or its vehicle. The ratio detector 218 may be implemented with a suitable analog comparator, and the bearing angle calculator 291 may be implemented with a suitable processor executing instructions stored in a memory, such as a read-only memory (ROM). Alternatively, the signals 214 and 216 may be digitized by suitable analog-to-digital converters, and digitized data may be analyzed by the bearing angle calculator 219. The navigation calculator 220 may be implemented by a processor executing instructions stored in a memory. One processor may implement both the bearing angle calculator 219 and the navigation calculator 220, or separate processors may be used. The star catalog 222 may be stored in a non-volatile memory, such as a read-only memory (ROM), disposed proximate the navigation calculator 220.

In some embodiments, a single integrated circuit includes both the star catalog 222 and the navigation calculator 220. In some embodiments, the star catalog 222 is stored remote from the navigation calculator 220, such as in a server on earth, while the navigation calculator 220 is disposed in a vehicle in space. The processor(s) execute instructions in order to perform algorithms, such as to calculate a bearing angle from the ratio of signals 214 and 216, as described herein.

Figure 3:
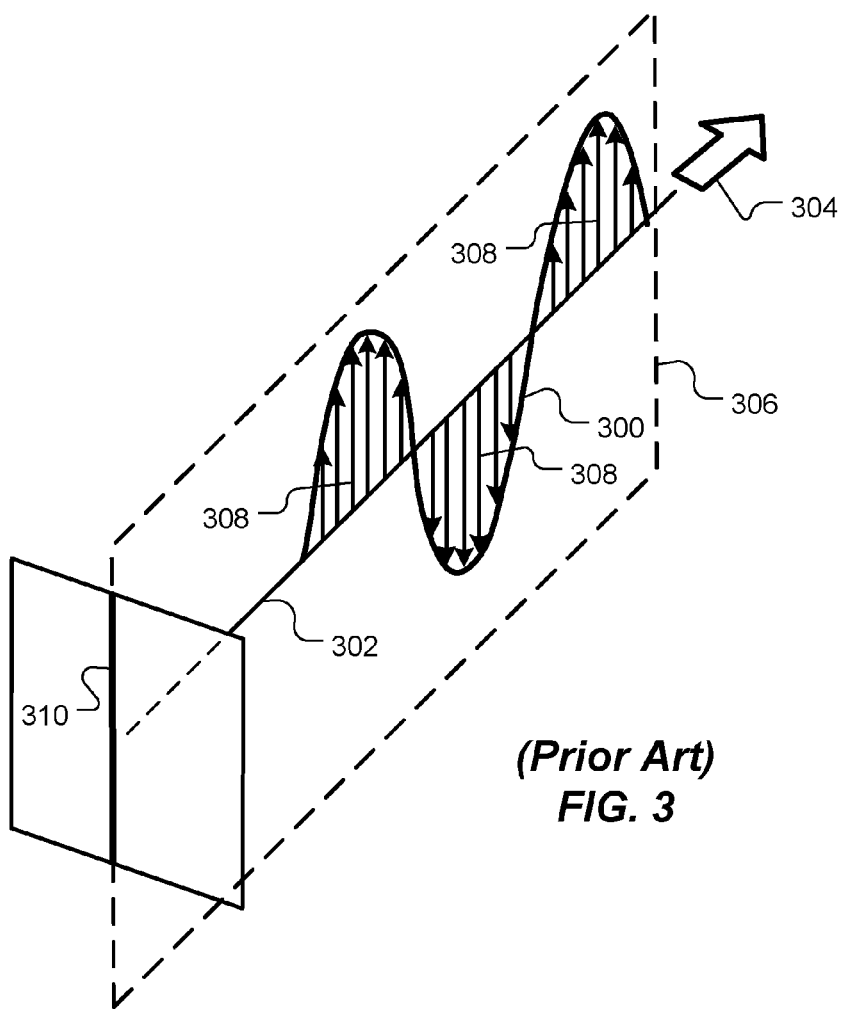
FIG. 3 is a schematic diagram of a propagating, linearly polarized, electromagnetic wave, as known in the prior art.
Figure 4:
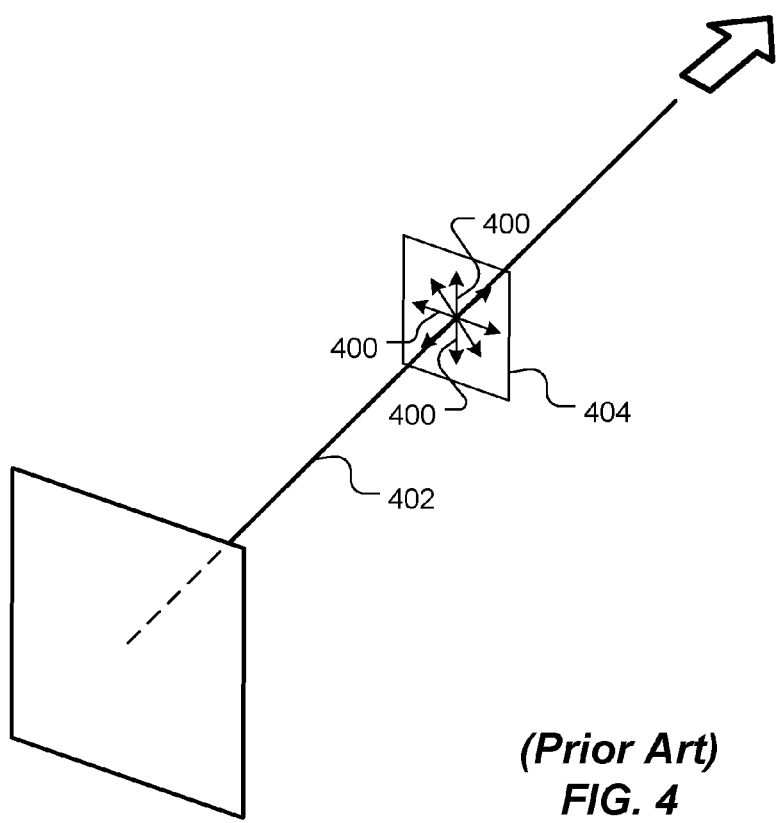
FIG. 4 is a schematic diagram of a propagating unpolarized electromagnetic wave, as known in the prior art.

As noted, embodiments of the present invention do not rely on receiving polarized light. However, FIGS. 3 and 4 provide background information about polarization, polarized light and unpolarized light, which may be useful in understanding embodiments of the invention. Electromagnetic radiation, referred to herein as "light," behaves as waves propagating through space, and also as photon particles traveling through space. As an electromagnetic wave, electromagnetic radiation has both electric field and magnetic field components, which oscillate in fixed phase relationship to each other, and spatially perpendicular to each other and perpendicular to the direction of propagation.

FIG. 3 schematically illustrates a hypothetical electric field component 300 of a linearly polarized electromagnetic wave propagating along an axis 302 in a direction indicated by arrow 304. The electric field component 300 oscillates sinusoidally within a plane 306 that includes the propagation axis 302. As the wave 300 propagates, its electric field can be conceptualized as a set of arrows indicating direction and intensity (vectors) of the electric field, exemplified by arrows 308, within the plane 306. The wave 300 is said to be polarized within the plane 306 or along a line 310 within the plane 306 and perpendicular to the axis of propagation 302.

For simplicity, the magnetic field component is omitted from FIG. 3. However, the magnetic field component also propagates along the axis 302. The magnetic field component oscillates in a plane (not shown) that is perpendicular to the electric field plane 306.

As noted, the electromagnetic radiation depicted in FIG. 3 is linearly polarized. Its electric field component is confined to a plane 306, and its magnetic field component is confined to a perpendicular plane (not shown).

Most common sources of visible light, including thermal (black body) radiation, such as star light, and fluorescence (but not lasers), produce light described as incoherent. In this case, radiation is produced, i.e., photons are emitted, independently by a large number of atoms or molecules whose emissions are uncorrelated with each other and generally of random polarizations. Thus, essentially, each photon produced is randomly polarized. In this case, the light is said to be unpolarized. This term is somewhat inexact, since at any instant of time, at one location, there is a definite direction to the electric and magnetic fields. However, the term unpolarized implies that the polarization changes so quickly in time that it will not be measured or it is irrelevant to the outcome of an experiment. Over time, a receiver of unpolarized light receives all possible polarizations.

FIG. 4 schematically illustrates hypothetical electric field vectors, exemplified by vectors 400, of an unpolarized electromagnetic wave at a point along an axis 402 of propagation. In contrast with the linear polarized light of FIG. 3, over time, the electric field vectors 400 aim in all directions radially away from the propagation axis 402. The electric field vectors 400 all lay within a plane 404 perpendicular to the axis of propagation 402. The magnetic field components are omitted for clarity.

Figure 5:
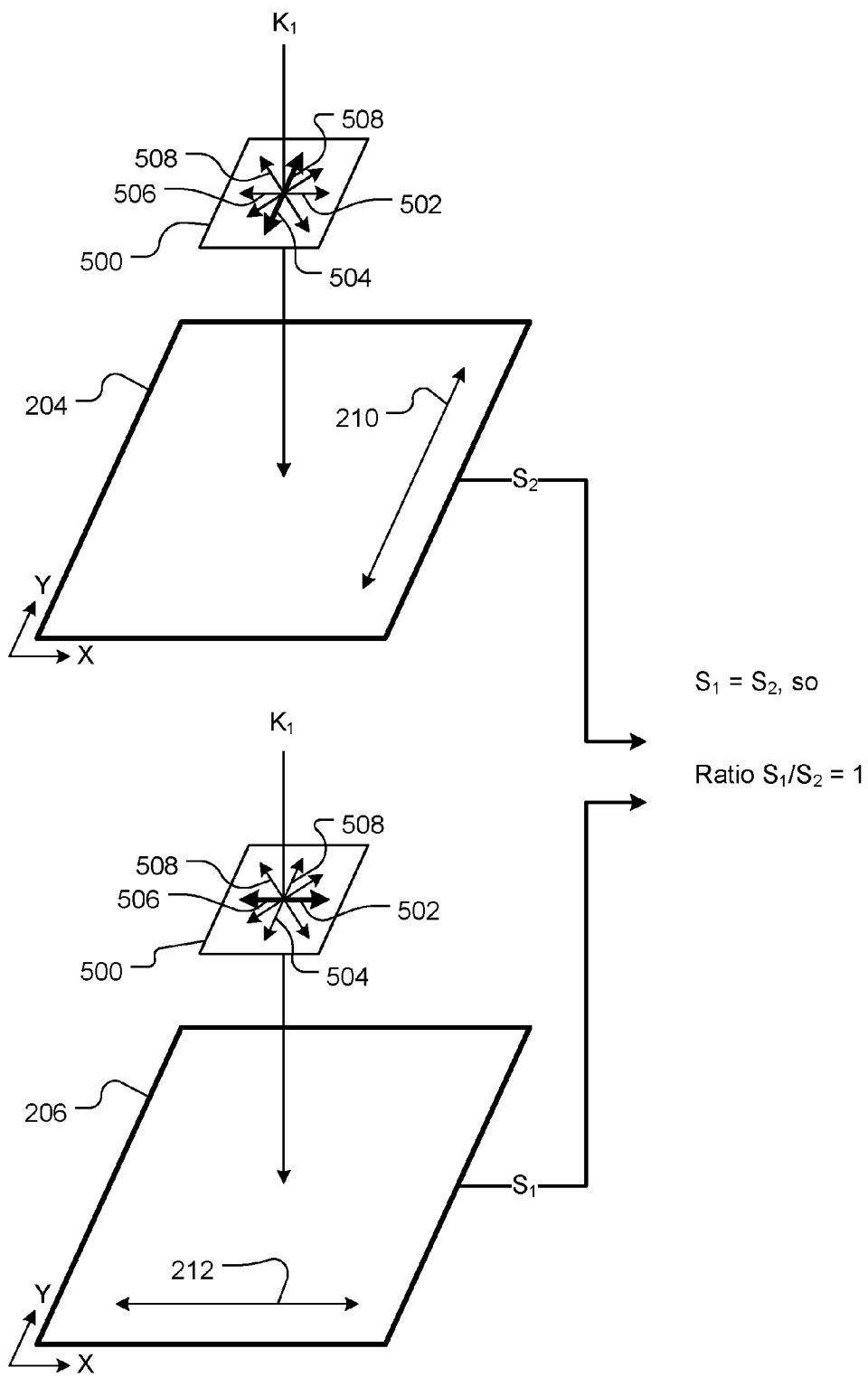
FIG. 5 is a schematic diagram of two polarization-sensitive light sensors of the star tracker of FIG. 2, according to an embodiment of the present invention. Incident light, impinging on the two polarization-sensitive light sensors at an angle of incidence of 0 degrees, is shown.

As noted with respect to FIG. 2, unpolarized light from the star 202 impinges on two polarization-sensitive light sensors 204 and 206. FIG. 5 is a schematic diagram of the two polarization-sensitive light sensors 204 and 206, shown separated for clarity. In FIG. 5, the propagation axis of the light is assumed to be normal (perpendicular) to the polarization-sensitive light sensors 204 and 206, i.e., the angle of incidence is 0 degrees. Light radiation from the star is represented by a propagation vector $K_1$. The light from the star is unpolarized, as indicated by electric field vectors aimed in all possible directions within a plane 500 perpendicular to the vector $K_1$. The electric field vectors are exemplified by vectors 502, 504, 506 and 508. The magnetic field components are omitted for clarity.

Light sensor 204 is sensitive to light polarized along its axis 210, whereas light sensor 206 is sensitive to light polarized along a different axis 212. Thus, light sensor 204 is stimulated primarily by photons whose polarizations correspond to electric field vectors oriented parallel to its axis 210, such as electric field vectors 504 and 508, shown in bold in the upper portion of FIG. 5. To a lesser extent, the light sensor 204 may be stimulated by photons of other polarizations.

Similarly, light sensor 206 is stimulated primarily by photons whose polarizations correspond to electric field vectors oriented parallel to its axis 212, such as electric field vectors 502 and 506, shown in bold in the lower portion of FIG. 5. To a lesser extent, the light sensor 206 may be stimulated by photons of other polarizations.

As noted, each polarization-sensitive light sensor 204 and 206 generates a respective signal $S_1$ and $S_2$, such as a voltage, in proportion to the amount of light detected by the light sensor. Because the star light is unpolarized (each photon is randomly polarized), the amount of radiation polarized along the axis 210 is equal to the amount of radiation polarized along the axis 212. The vector $K_1$ is normal to the two light sensors 204 and 206. Thus, each light sensor 204 and 206 is equally stimulated. $S_1=S_2$, thus the ratio $S_1/S_2=1$. A ratio of 1 indicates the angle of incidence is 0 degrees.

Figure 6:
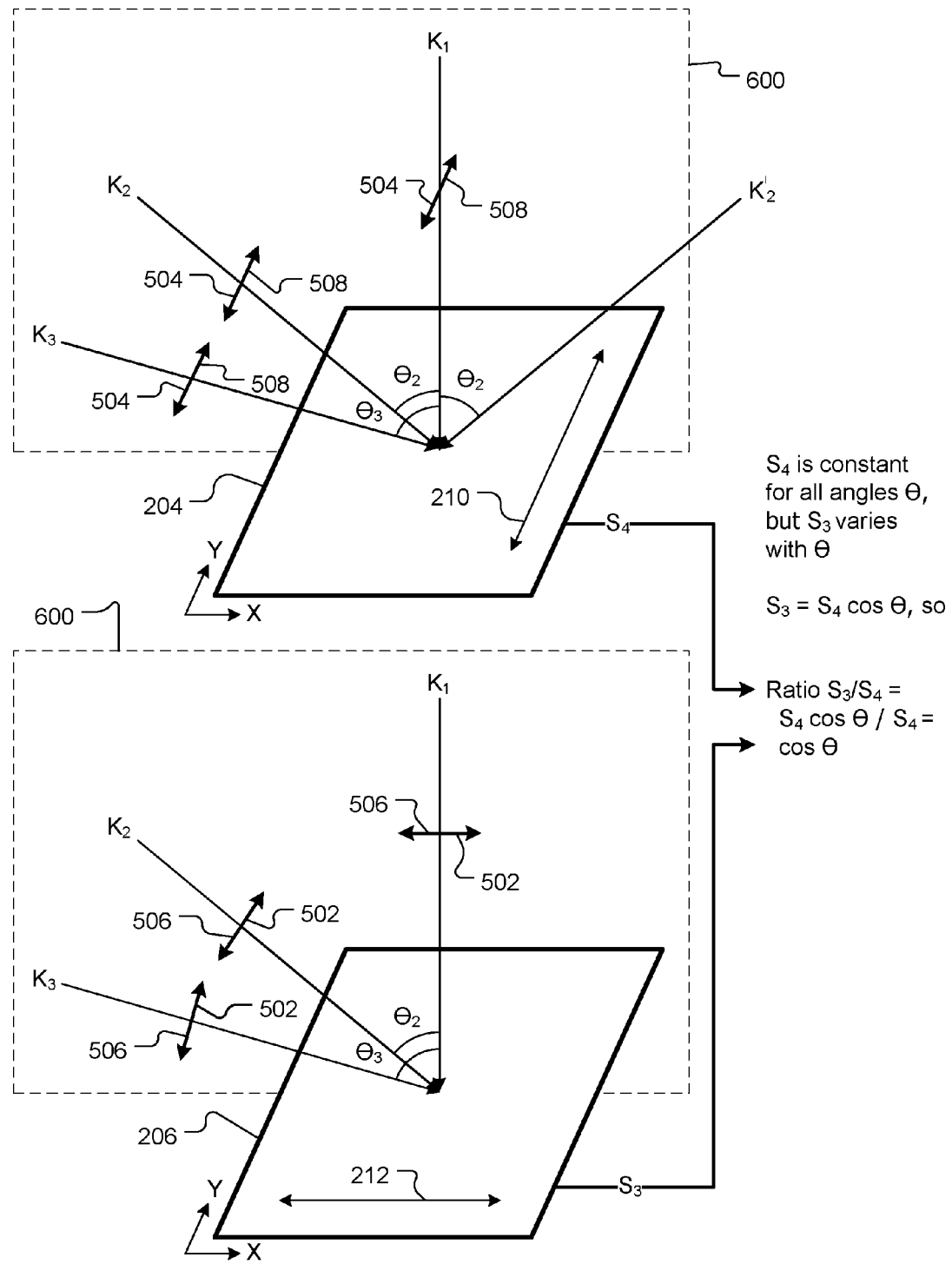
FIG. 6 is similar to FIG. 5. Incident light, impinging on the two polarization-sensitive light sensors at several angles of incidence are shown.

FIG. 6 is similar to FIG. 5; however two additional vectors $K_2$ and $K_3$ are shown. Vector $K_2$ represents light from a star impinging on the two polarization-sensitive light sensors 204 and 206 at an incident angle $\theta_2$, and vector $K_3$ represents light from a star impinging on the two polarization-sensitive light sensors 204 and 206 at an incident angle $\theta_3$. The vectors $K_1$, $K_2$ and $K_3$ lie in a plane 600 that is perpendicular to the polarization-sensitive light sensors 204 and 206, perpendicular to the polarization axis 210 of polarization-sensitive light sensor 204 and parallel to the polarization axis 212 of polarization-sensitive light sensor 206.

Electric field vectors 504 and 508 are shown in the upper portion of FIG. 6. Recall that electric field vectors 504 and 508 are parallel to the axis 210, along which the polarization-sensitive light sensor 204 is sensitive. Electric field vectors 502 and 506 are shown in the lower portion of the figure. Recall that electric field vectors 502 and 506 are parallel to the axis 212, along which the polarization-sensitive light sensor 206 is sensitive. The other electric field vectors are omitted for clarity, although they may stimulate the polarization-sensitive light sensors 204 and 206 to extents, depending on their polarization angles, relative to the polarization axes 210 and 212.

Regardless of the angle of incidence θ, electric field vectors 504 and 508 remain perpendicular to the plane 600 and parallel to the axis 210 of the polarization-sensitive light sensor 204. Therefore, the amount by which the polarization-sensitive light sensor 204 is stimulated is largely independent of the angle of incidence θ.

However, the electric field vectors 502 and 506 are in the plane 600. These electric field vectors 502 and 506 are parallel to the axis 212 of the polarization-sensitive light sensor 206 only when the angle of incidence θ is zero. As the angle of incidence θ increases from 0 to 90 degrees, the electric field vectors 502 and 506 become progressively less parallel, and progressively more perpendicular, to the axis 212 of the polarization-sensitive light sensor 206. Consequently, the amount by which the polarization-sensitive light sensor 206 is stimulated is highly dependent on the angle of incidence θ.

Another way of expressing the concepts shown in FIG. 6 involves noting that the polarization state of each photon of incoming star light is perpendicular to the light's propagation vector $K_n$, even if the light is unpolarized. The light may, in general, be represented by randomly polarized light, where the Stokes vector can be decomposed into two orthogonal polarization components. The two orthogonal polarization components define a plane that is perpendicular to the path of propagation of the star light. These orthogonal polarization components are detected by the polarization-sensitive light sensors 204 and 206. Each of the polarization-sensitive light sensors 204 and 206 does not necessarily detect one of the two orthogonal polarization components. Instead, the ratio of the signals from the polarization-sensitive light sensors 204 and 206, and in some cases from an additional one or more polarization-sensitive light sensors, is used to resolve the two orthogonal polarization components. The path of propagation of the star light is then calculated from the two polarization components, based on the knowledge that the path is perpendicular to both of the decomposed polarization components.

Figure 7:
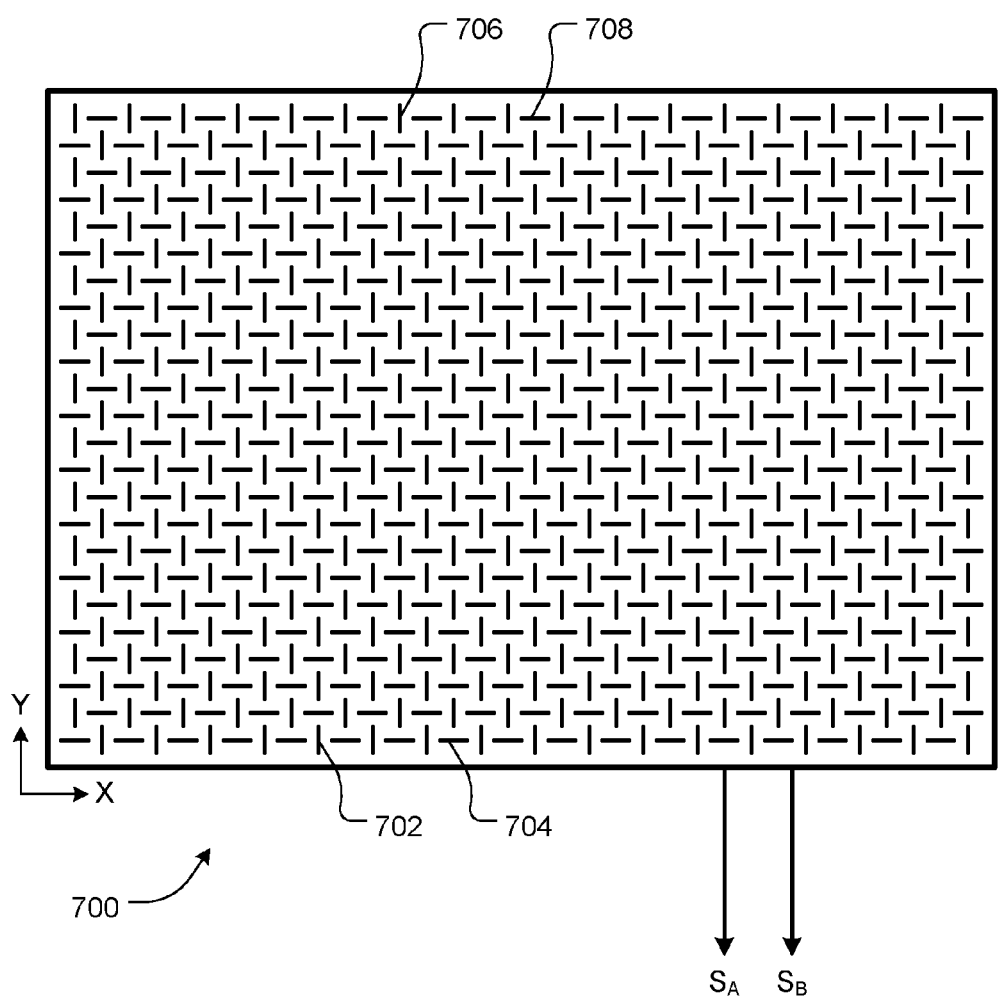
FIG. 7 is a schematic top view of an embodiment of a polarization sensing element (poxel), which may be used to implement the two polarization-sensitive light sensors of FIGS. 2, 5 and 6, according to an embodiment of the present invention.

FIG. 7 is a schematic top view of an embodiment of a polarization sensing element (poxel) 700, according to an embodiment of the present invention. The poxel 700 is shown as being rectangular; however, other shapes can be used. The poxel 700 is preferably fabricated using semiconductor wafer fabrication techniques. The poxel 700 includes a sub-millimeter thin substrate with nanoscale elements, exemplified by elements 702, 704, 706 and 708, on its surface. The elements 702-708 directly sense polarization components of incoming light. In some embodiments, the elements 702-708 are nanoantennas. These may be optical nanoantennas, rectennas, nanophotonic phased arrays, nanomaterials (such as metal-on-graphene), plasmonic antennas, or the like. These elements may be patterned directly on the surface of the poxel using conventional semiconductor fabrication techniques, such as electron-beam (e-beam) lithography or deep-ultraviolet (deep-UV) photolithography. Nanometallic, such as plasmonic, structures may be used to concentrate light into deep-subwavelength volumes, facilitating sensing electromagnetic radiation having visible, near visible or invisible wavelengths, as discussed by Jon A. Schuller, et al., in Plasmonics for extreme light concentration and manipulation, pp. 193-204, Nature Materials, Vol. 9, March 2010, the entire contents of which are hereby incorporated by reference.

Figure 8:
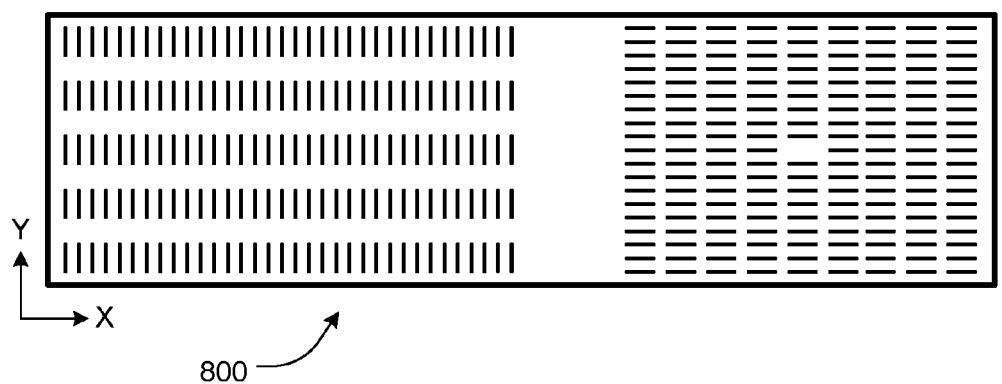
FIG. 8 is a schematic top view of another embodiment of a polarization sensing element (poxel), according to an embodiment of the present invention.

The poxel 700 may include any number of elements 702-708. In most embodiments, half the elements 702-708 are oriented along the axis 210 (FIG. 6) of one polarization-sensitive light sensor 204, and the other half of the elements 702-708 are oriented along the axis 212 of the other polarization-sensitive light sensor 206. For example, as illustrated in FIG. 7, elements 702 and 706 may be oriented parallel to a Y axis (as is axis 210), whereas elements 704 and 708 may be oriented parallel to an X axis (as is axis 212). In the embodiment of FIG. 7, the element orientations alternate along rows and columns. However, other arrangements of orientations may be used. For example, as shown schematically in FIG. 8, a poxel 800 may have like-oriented elements grouped together.

Returning to FIG. 7, the number of elements 702-704 may be selected based on a desired overall size and/or shape of the poxel 700 and the size of each element, which may depend on the wavelength of the radiation to be detected. Some embodiments may include about 1,000 elements of each orientation, for example.

All like-oriented elements 702-708 may be electrically connected together, preferably within the substrate, thus voltages generated by all the like-oriented elements add together, and their signals are made available on signal lines, such as signal lines $S_A$ and $S_B$. The signal lines $S_A$ and $S_B$ correspond to the signal lines $S_3$ and $S_4$ in FIG. 6. To limit physical distortion of the poxel, the substrate material and construction should be selected to have a low coefficient of thermal expansion, because most practical materials do not expand isometrically in response to changes in temperature. Furthermore, in many applications, such as space-based applications, the poxel may be heated unevenly.

Figure 17:
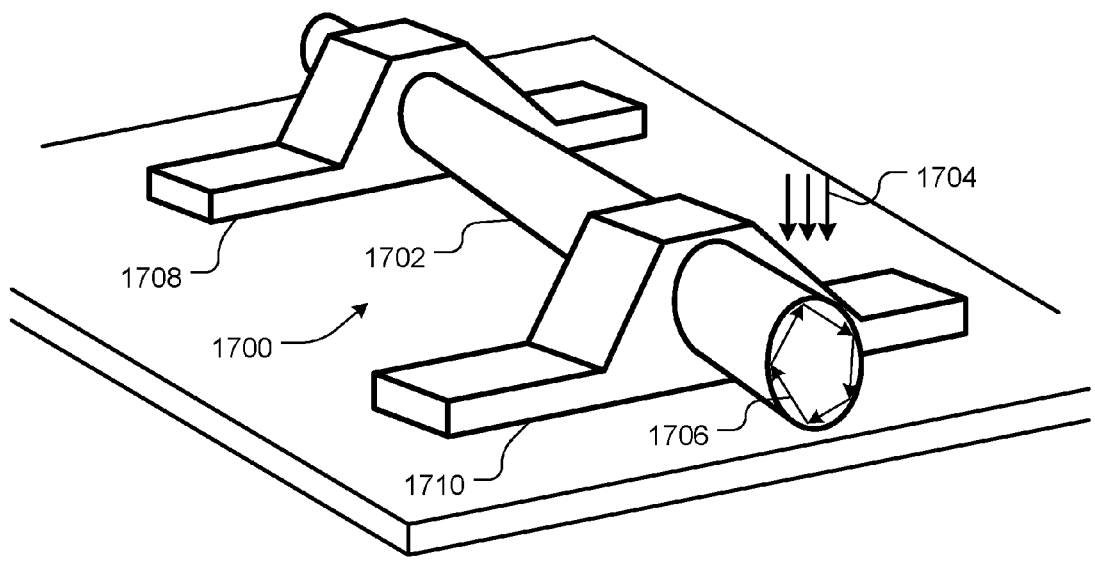
FIG. 17 is a perspective schematic view of a semiconductor nanowire antenna, which may be used to implement each element of the poxel of FIGS. 7 and 8, according to an embodiment of the present invention.

FIG. 17 is a perspective schematic view of a metal-semiconductor-metal germanium photodetector/semiconductor nanowire antenna 1700. Each element 702-708 of the poxel 700 (FIG. 7) may be implemented as such a nanowire antenna 1700. As noted by Linyou Cao, et al., in Resonant Germanium Nanoantenna Photodetectors, pp. 1229-1233, Nano Letters, 2010 (hereinafter "Cao"), the contents of which are hereby incorporated by reference, a sufficiently large nanowire 1702 can be thought of as a cylindrical cavity antenna that traps incident light 1704 in circulating orbits by multiple total internal reflections from the periphery of the nanowire 1702, as indicated by arrows 1706. FIG. 17 is based on an illustration from Cao.

The nanowire antenna 1700 may be fabricated by intrinsically growing a germanium (Ge) nanowire 1702 using a chemical vapor deposition process, and electrical contacts 1708 and 1710, for example 2 nm of Ti/400 nm of Al and 5 nm of Cr/400 nm of Pt), may be defined at the ends of the nanowire 1702 with standard e-beam lithography, metal deposition and lift-off techniques. The electrode metals may be chosen to form an asymmetric metal-semiconductor-metal detector, with one Schottky contact 1708 and one Ohmic contact 1710.

The nanowire antenna 1700 is both wavelength and polarity selective, based on the size and orientation of the nanowire 1702. The nanowire 1702 may be designed to be resonant at a desired wavelength, such as at a peak in the electromagnetic spectrum of a star of interest. A plurality of nanowires of various sizes, and therefore resonant at a variety of wavelengths, may be included in a single poxel 700 (FIG. 7) to provide multiple wavelength or broadband sensitivity, or all the nanowires may be of identical size.

Returning to FIG. 6, if $S_4$ represents magnitude of the signal from the polarization-sensitive light sensor 204, and $S_3$ represents magnitude of the signal from the polarization-sensitive light sensor 206, $S_3=S_4 \cos \theta$. The ratio of the magnitudes of the signals from the two polarization-sensitive light sensors 204 and 206 is $S_3/S_4=S_4 \cos \theta/S_4=\cos \theta$.

Thus, the angle of incidence θ may be determined from the ratio $S_3/S_4$. As noted, all the vectors $K_n$ in FIGS. 5 and 6 lie in the plane 600.

Figure 18:
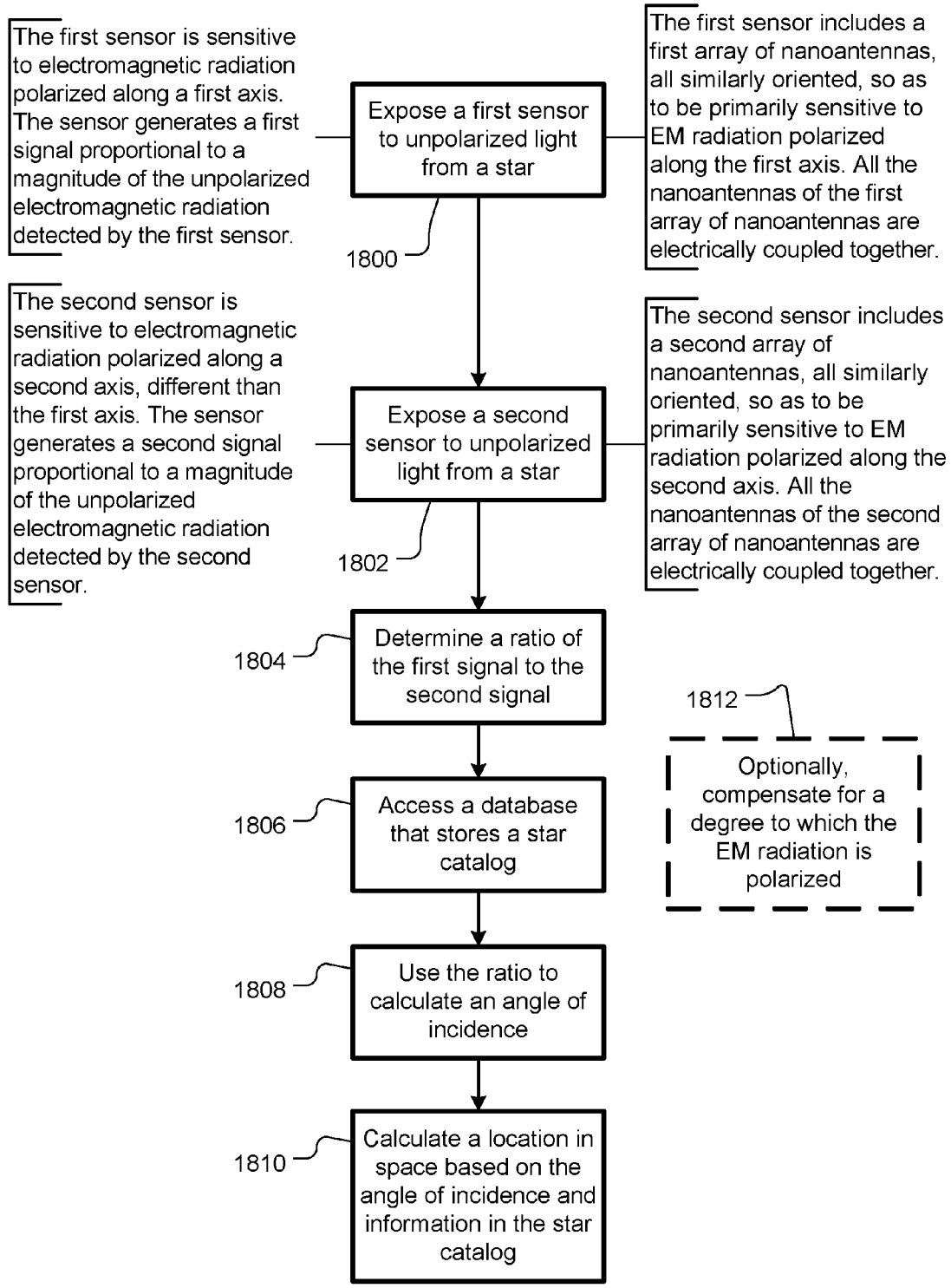
FIG. 18 is a schematic flowchart illustrating a method for determining a direction to a source of unpolarized electromagnetic radiation, such as light from a star, according to an embodiment of the present invention.

FIG. 18 is a schematic flowchart illustrating a method for determining a direction to a source of unpolarized electromagnetic radiation, such as light from a star. At 1800, a first sensor is exposed to the unpolarized light from the source of unpolarized electromagnetic radiation. The first sensor is sensitive to electromagnetic radiation polarized along a first axis. The sensor generates a first signal proportional to the magnitude and direction of the unpolarized electromagnetic radiation detected by the first sensor. The first sensor may include a first array of nanoantennas, all similarly oriented, so as to be primarily sensitive to electromagnetic (EM) radiation polarized along the first axis. All the nanoantennas of the first array of nanoantennas may be electrically coupled together.

At 1802, a second sensor is exposed to the unpolarized light. The second sensor is sensitive to electromagnetic radiation polarized along a second axis, different than the first axis. The sensor generates a second signal proportional to the magnitude and direction of the unpolarized electromagnetic radiation detected by the second sensor. The second sensor may include a second array of nanoantennas, all similarly oriented, so as to be primarily sensitive to EM radiation polarized along the second axis. All the nanoantennas of the second array of nanoantennas may be electrically coupled together.

At 1804, a ratio of the first signal to the second signal is determined. At 1806, a database storing a star catalog is accessed. At 1808, the ratio is used to calculate an angle of incidence. At 1810, the angle of incidence and information, such as angles of incidence to various stars, in the star catalog is used to calculate an orientation in space. An optional operation 1812 is described below.

Returning to FIG. 6, it should be noted that a given ratio of $S_3/S_4$ can represent two different vectors $K_n$, as illustrated by vector $K'_2$, which is symmetric with vector $K_2$. If a star of interest is known to be within a quarter-sphere field of view centered on the polarization-sensitive light sensors 204 and 206, this ambiguity can be resolved by ignoring the symmetric vector that falls outside the quarter sphere.

Figure 9:
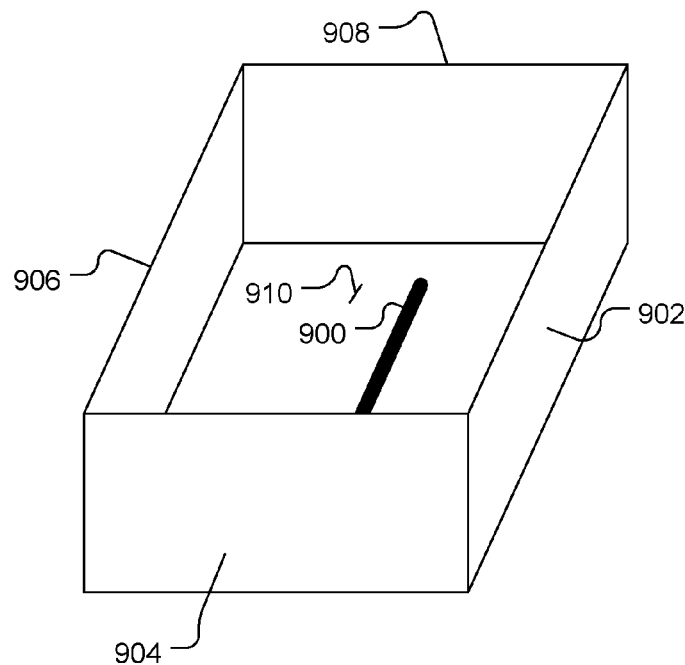
FIG. 9 is a schematic perspective view of a baffle around one element of a poxel, according to an embodiment of the present invention.

Optionally or alternatively, some or all the elements of the poxel may have baffles to block portions of what would otherwise be their fields of view, as shown schematically in FIG. 9. FIG. 9 shows one baffle. The baffles should be largely or completely opaque to EM radiation at wavelengths of interest. Such baffles may be used to block a portion of the field of view, so as to prevent the element being illuminated by light from an undesired source, such as the sun or a star not used for navigation. For example, the baffles may be constructed so as to limit a poxel's field of view to a single star.

FIG. 9 shows one element 900 of a poxel. Walls 902, 904, 906 and 908 extend upward from the substrate 910 and limit the field of view of the element 900. Each element of a poxel, or each element of a polarization-sensitive light sensor, may have a similar set of walls forming a respective baffle. All the walls 902-908 in FIG. 9 are shown to be vertical, relative to the substrate 910, and of equal height. However, different walls may be of different heights and/or different angles, relative to the substrate 910, depending on a desired field of view for the element 900.

Similarly, all the elements need not have identical fields of view. For example, all elements having a first orientation may all have a first field of view, whereas all elements having a second, different, orientation may have a second, different, field of view. The walls 902-908 may be fabricated by conventional semiconductor fabrication techniques. Although a square baffle, comprising four walls 902-908, is shown, other numbers of walls and other shape baffles may be used. Each wall 902-908 may also be part of a baffle for an adjacent element (not shown). Although only one element is disposed within the baffle shown in FIG. 9, other numbers of similarly- or differently-oriented elements may be disposed within each baffle.

Figure 10:
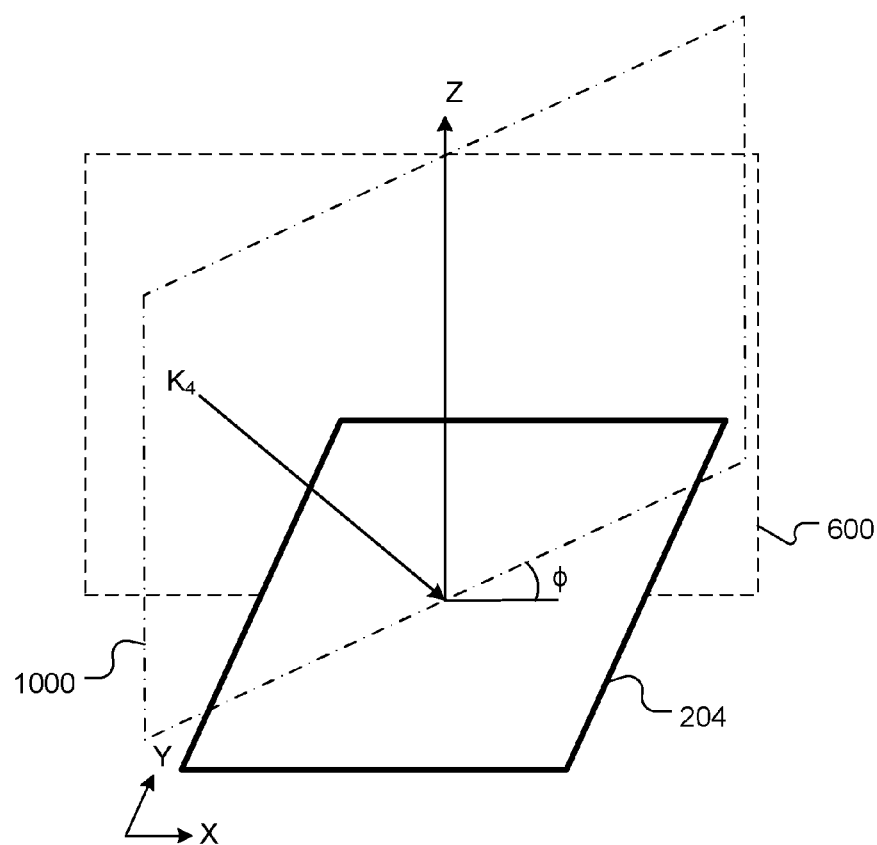
FIG. 10 is a schematic diagram similar to FIGS. 5 and 6, except the incident light vector lies in a plane that is not aligned with either of the two polarization-sensitive light sensors.

As noted with respect to FIG. 6, using two polarization-sensitive light sensors 204 and 206, an angle of incidence θ may be determined, with a possibility of one ambiguity, if the incident light lies within a plane 600 aligned with one of the two axes 210 or 212 of the polarization-sensitive light sensors 204 and 206. In some cases, these constrains are acceptable. However, in other cases, the incident light cannot be assumed to lie within the plane 600. For example, as schematically illustrated in FIG. 10, the incident light vector $K_4$ may lie in a plane 1000 that is perpendicular to the polarization-sensitive light sensor 204 or 206, but that is rotated by an angle φ about a Z axis. In such cases, the ratio of signals from the two polarization-sensitive light sensors 204 and 206 yield several ambiguities. If these ambiguities are acceptable, for example if the possible directions from which the impinging light originates are constrained sufficiently to avoid the ambiguities, two polarization-sensitive light sensors 204 and 206 may be sufficient.

Figure 11:
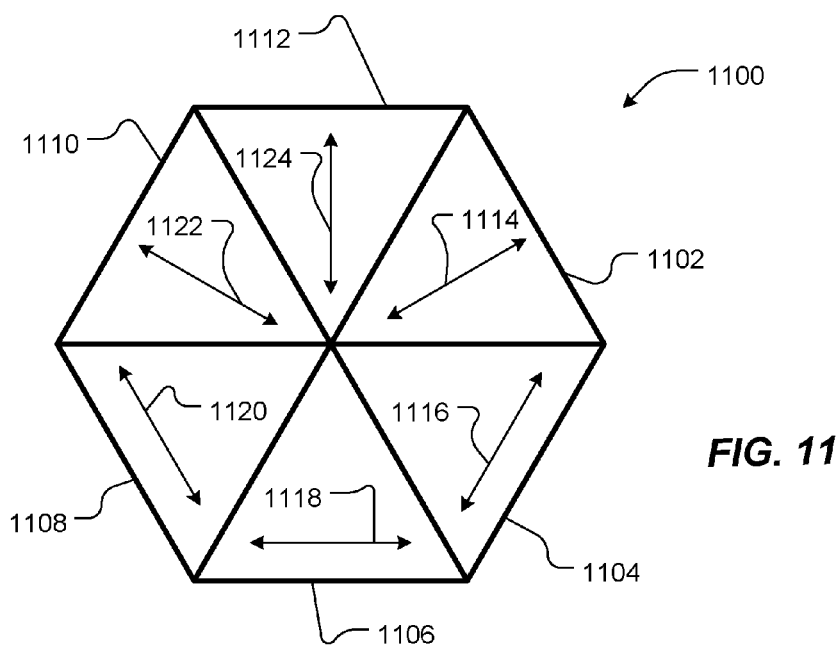
FIG. 11 is a schematic top view of a six-axis polarization-sensitive light sensor, according to an embodiment of the present invention.

In other cases, additional polarization-sensitive light sensors, aligned differently than the polarization-sensitive light sensors 204 and 206, may be included to remove the ambiguities. For example, FIG. 11 is a schematic top view of a six-axis polarization-sensitive light sensor 1100, according to an embodiment of the present invention. The six-axis polarization-sensitive light sensor 1100 contains six segments 1102, 1104, 1106, 1108, 1110 and 1112. Each segment 1102-1112 is sensitive to light polarized along its respective axis, indicated by arrows 1114, 1116, 1118, 1120, 1122 and 1124, respectively.

Figure 12:
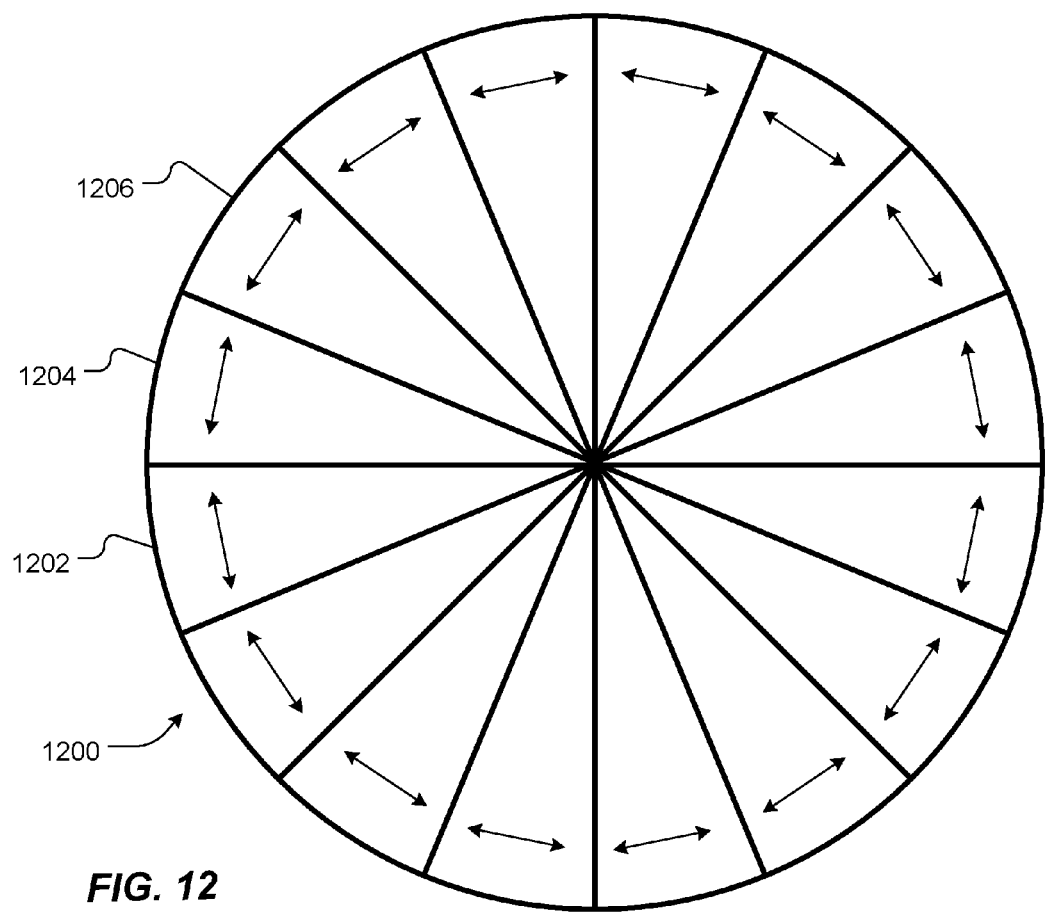
FIG. 12 is a schematic top view of an eight-axis polarization-sensitive light sensor, according to an embodiment of the present invention.

FIG. 12 is a schematic top view of an eight-axis polarization-sensitive light sensor 1200, according to an embodiment of the present invention. The eight-axis polarization-sensitive light sensor 1200 contains sixteen segments, exemplified by segments 1202, 1204 and 1206. Each segment 1202-1206 is sensitive to light polarized along its respective axis, indicated by arrows within the segments 1202-1206.

Figure 13:
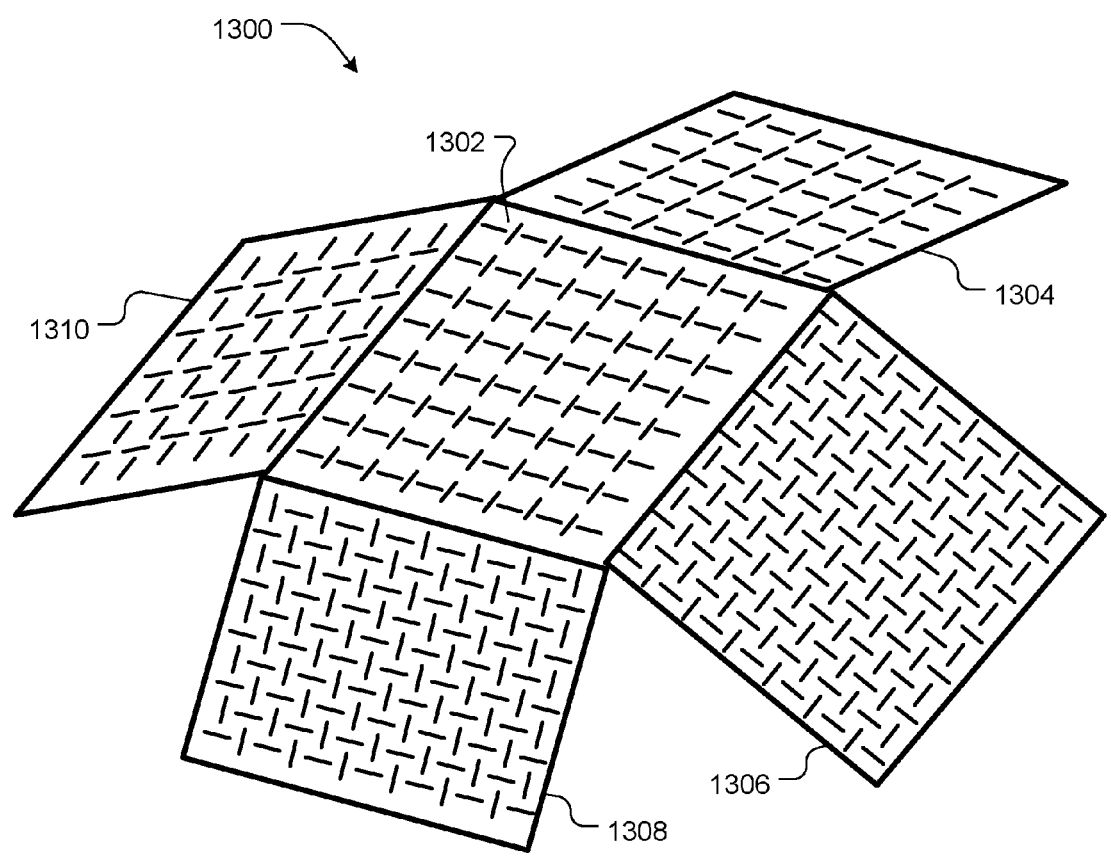
FIG. 13 is a perspective schematic view of a non-coplanar five-axis polarization-sensitive light sensor, according to an embodiment of the present invention.

The embodiments described with respect to FIGS. 11 and 12 are planar. Optionally or alternatively, non-coplanar polarization-sensitive light sensors may be used to remove the ambiguities. FIG. 13 is a perspective schematic view of a non-coplanar five-axis polarization-sensitive light sensor 1300, according to an embodiment of the present invention. The sensor 1300 includes five non-coplanar segments 1302, 1304, 1306, 1308 and 1310. Each segment 1302-1304 includes two sets of differently oriented elements. The segments 1302-1310 may be fabricated separately or together on a common substrate.

Figure 20:
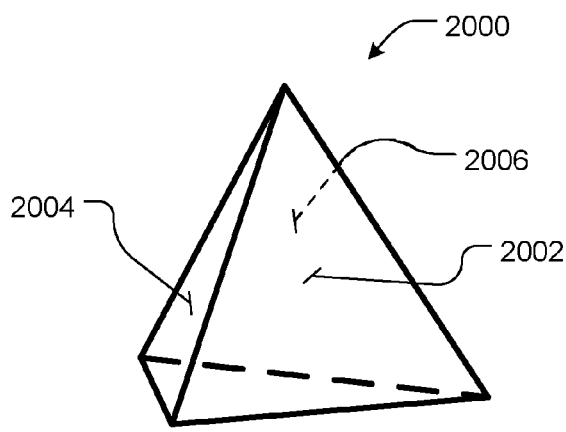
FIG. 20 is a perspective schematic view of a non-coplanar three-poxel polarization-sensitive light sensor, according to another embodiment of the present invention.

FIG. 20 is a perspective schematic view of a non-coplanar three-poxel polarization-sensitive light sensor 2000, according to an embodiment of the present invention. Each surface (segment) 2002, 2004 and 2006 contains two sets of differently oriented elements. The elements are not shown in FIG. 20.

Figure 14:
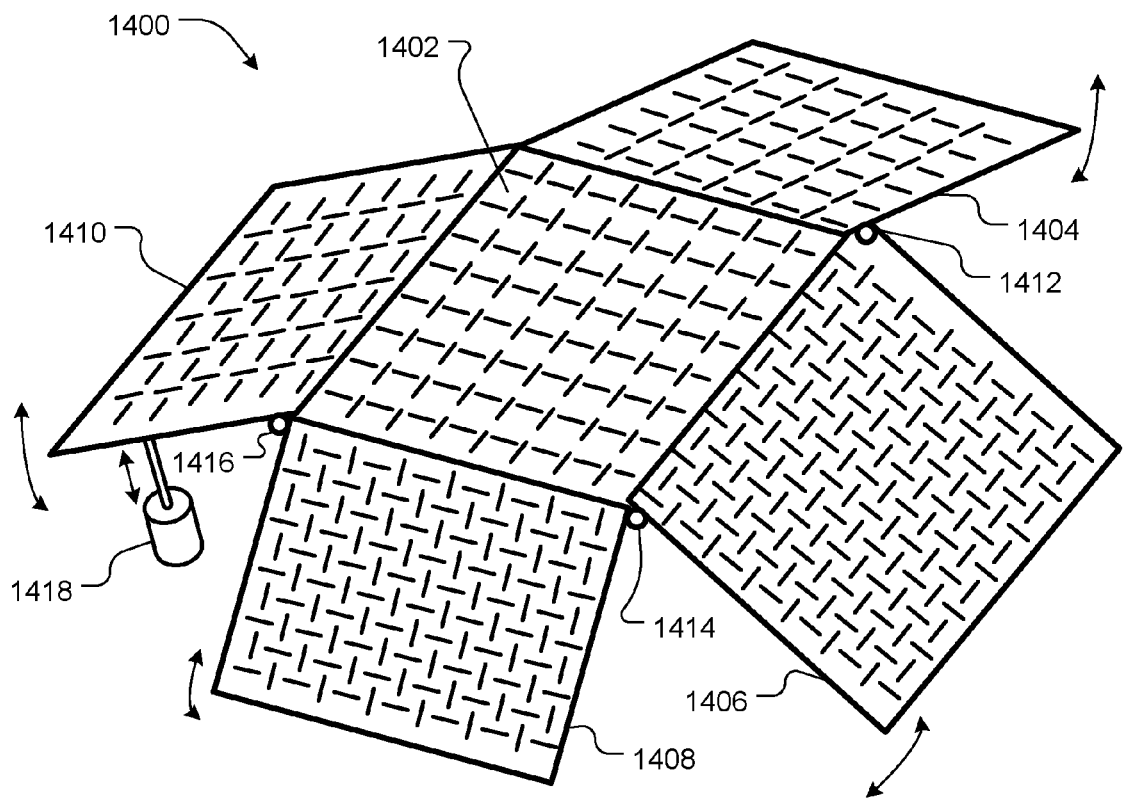
FIG. 14 is a perspective schematic view of a non-coplanar five-axis polarization-sensitive light sensor with articulated segments, according to an embodiment of the present invention.

Optionally or alternatively, one or more segments of a polarization-sensitive light sensor may be hinged, so the segment's orientation may be changed, relative to another segment of the polarization-sensitive light sensor, as schematically illustrated in FIG. 14. In such an embodiment, the hinged segments are referred to herein as being articulated. The five-axis polarization-sensitive light sensor 1400 is similar to the five-axis polarization-sensitive light sensor 1300 described with respect to FIG. 13. However, one or more of the segments 1404, 1406, 1408 and/or 1410 are mounted via hinges, three of which are visible at 1412, 1414 and 1416. The hinges 1412-1416 enable their respective segments 1404-1410 to pivot, as indicated by curved arrows, relative to each other and to segment 1402.

The segments 1404-1410 may be driven by suitable motors, represented by motor 1418, such as a piezoelectric motor, ultrasonic linear motor, microelectromechanical (MEMS) motor or another suitable drive system. Tilting one or more of the segments 1404-1410 enable the ratio detector 218 (FIG. 2) or the bearing angle calculator 219 to resolve one or more ambiguities. The motor(s) may be driven by the ratio detector 218 (FIG. 2), the angle calculator 219 and/or the navigation calculator 220 (FIG. 2).

Figure 15:
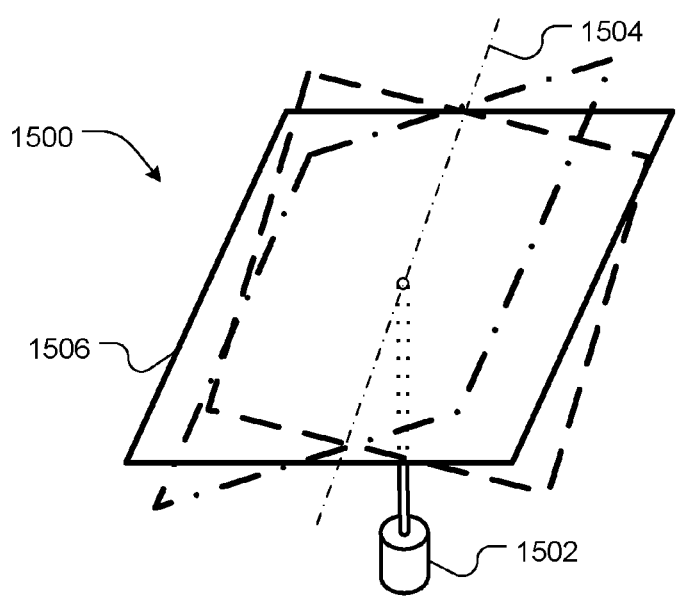
FIG. 15 is a perspective schematic view of a tiltable single segment polarization-sensitive light sensor, according to an embodiment of the present invention.

Some embodiments, such as the embodiment 1500 schematically illustrated in FIG. 15, have only one segment that can be oriented by a suitable motor to any of several tilts by a suitable motor 1502. In either case, the ratio detector 218 (FIG. 2) and/or the angle calculator 219 may read data from the polarization-sensitive light sensors and then cause one or more segments to tilt, and then read additional data from the polarization-sensitive light sensor. In other words, two sets of data may be read from one or more of the polarization-sensitive light sensors, one data set before, and the other data set after, the sensor is tilted. A suitable memory may be used to store the first data set while the second data set is being acquired. Similarly, data may be read before the sensor is tilted and the data may be stored, and then data may be read after each tilt of a series of tilts. Although the embodiment illustrated in FIG. 15 tilts about one axis 1504, some other embodiments can tilt the sensor 1506 about two axes using one or two appropriate motors 1502.

Figure 19:
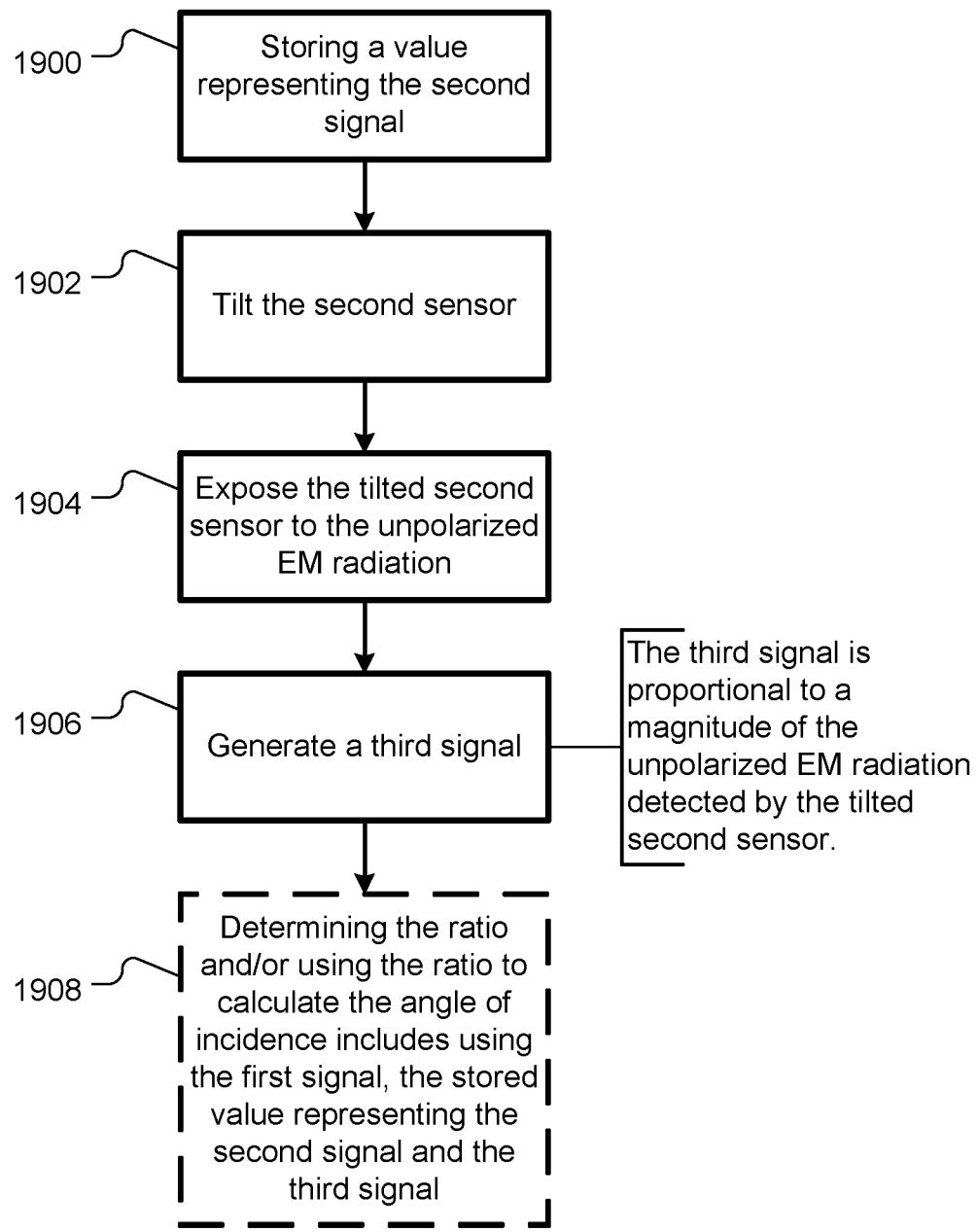
FIG. 19 is a schematic flowchart illustrating optional operations for the method of FIG. 18.

FIG. 19 is a schematic flowchart illustrating optional operations for the method of FIG. 18, in relation to tilting a segment of a poxel. At 1900, a value representing the second signal is stored. At 1902, the second sensor is tilted. At 1904, the tilted second sensor is exposed to the EM radiation. At 1906, a third signal is generated. The third signal is proportional to a magnitude of the unpolarized EM radiation detected by the tilted second sensor. Determining the ratio of the first signal to the second signal 1804 (FIG. 18) and using the ratio to calculate the angle of incidence of the unpolarized electromagnetic radiation 1808 includes using the first signal, the stored value representing the second signal and the third signal to calculate the angle of incidence of the unpolarized electromagnetic radiation, as indicated at 1908 (FIG. 19).

As noted, prior art star trackers include pixelated image sensors. The sensitivities of these image sensors depend on wavelength of incident light. However, polarization of the incident light does not depend on wavelength. Therefore, the polarization-sensitive light sensors described herein should provide sensitivity and signal-to-noise characteristics at least as good as conventional image sensor-based star trackers.

Figure 16:
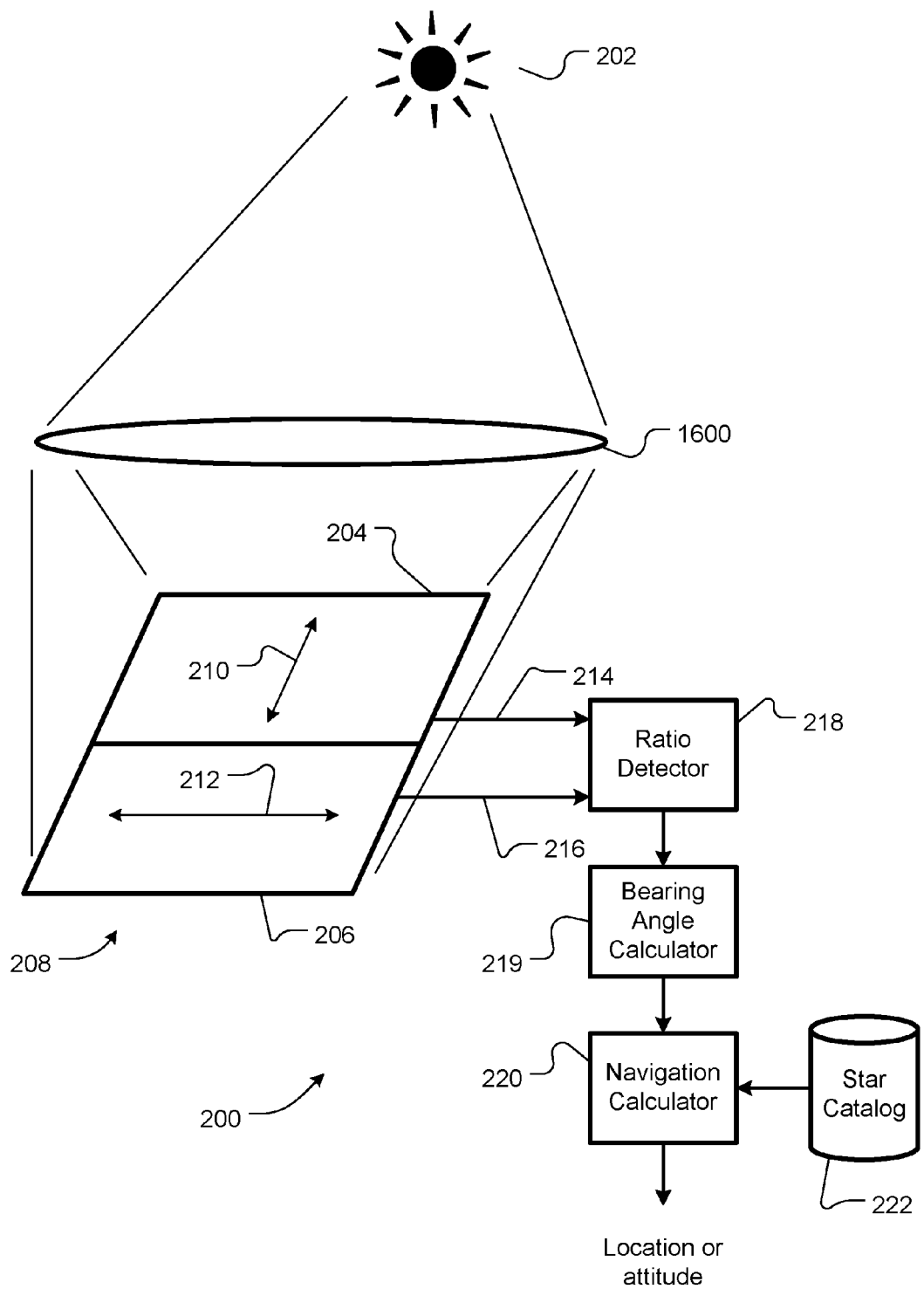
FIG. 16 is a schematic diagram of a star tracker, according to another embodiment of the present invention. The embodiment illustrated in FIG. 16 is similar to the embodiment of FIG. 2, however the embodiment of FIG. 16 includes a light-gathering lens.

Optionally, a lens 1600 may be disposed in front of the polarization-sensitive light sensors 204 and 206 to increase the light capture area (aperture), as schematically illustrated in FIG. 16. The lens 1600 may be larger than the polarization-sensitive light sensors 204 and 206 to provide a larger EM capture aperture. The lens 1600 need not be focused on the polarization-sensitive light sensors 204 and 206, and its alignment is not critical.

In some embodiments, the poxel elements include materials, such as metal-on-graphene, that are inherently more resistant to high-energy radiation than silicon-based devices, such as conventional image sensors. Resistance to high-energy radiation is important in space-based applications, because in these applications, vehicles are routinely subjected to high-energy radiation, such as heavy ions, neutrons and protons.

Light is said to be partially polarized when there is more power in one polarization mode than another. At any particular wavelength, partially polarized light can be statistically described as the superposition of a completely unpolarized component, and a completely polarized one. One may then describe the light in terms of the degree of polarization, and the parameters of the polarized component.

As noted, Jinkui Chu's polarization-based navigation system requires polarized light. Chu's system includes six light sensing photodiodes arranged in pairs. A polarizing filter is disposed in front of each photodiode. The polarizing filters of each pair of photodiodes are orthogonally oriented, relative to each other. The three pairs of polarizing filters are oriented at 0, 60 and 120 degrees, with respect to each other. A blue filter is disposed in front of the six polarizing filters. The entire collection of photodiodes, polarizing filters and blue filter is aimed straight up at the sky, a point Chu refers to as the "zenith," although Chu's device depends on light scattered by earth's atmosphere, not on stars in the celestial sphere.

Chu discloses a system of multiple equations in multiple unknowns, which is solved to ascertain an angle between the 0 degree orientation of the navigation sensor and the solar meridian. These equations include equation (1):

$$S_{ij}(\varphi)=KI(1+d\cos(2\varphi-2\varphi_{max})),\ i=1,2,3;\ j=0,1 \quad (1)$$

where d is the degree of polarization, $\varphi$ is the current orientation with respect to the solar meridian, K is a constant, I is total intensity and $\varphi_{max}$ is a value that maximizes $S(\varphi)$. Index i appears to be stepped through the three photodiode pairs, and index j appears to be stepped through the photodiodes of a given pair of photodiodes.

Clearly, from equation (1), if the degree of polarization d is zero, i.e., if unpolarized light impinges on Chu's device, the equations produce no useful result. Star light is unpolarized, or at most insufficiently polarized for Chu's device to produce a useful result. Structurally, if unpolarized light impinges on Chu's device, equal amounts of light are transmitted by the polarization filters to the photodiodes, regardless of the angle of incidence. Therefore, equal amounts of light impinge on each photodiode, regardless of the angle of incidence. Signals from the photodiodes do not, therefore, contain any information about the angle of incidence. In fact, Chu does not describe his device as determining an angle of incidence. Instead, Chu describes his device as determining an angle between the 0 degree orientation of the navigation sensor and the solar meridian. Consequently, Chu's device is incapable of determining the angle of incidence of any light, and the device is incapable of determining any angle with respect to unpolarized light.

In contrast, embodiments of the present invention work with unpolarized light. If the light impinging on the polarization-sensitive light sensors is polarized or partially polarized, the ratio detector 218 (FIG. 2) and/or the angle calculator 219 could compensate for the degree of polarization, because operation of the disclosed embodiments assumes the light is completely unpolarized. It is assumed that light impinging on each polarization-sensitive light sensor contains equal numbers of photons of every possible polarization. If this is not true, the signal from the polarization-sensitive light sensor whose orientation is closest to the (even slightly) polarized light should be reduced by an appropriate amount to compensate for the polarization of the light. Optionally or alternatively, the calculated ratio may be adjusted, or the calculated angle of incidence may be adjusted or the location in space may be adjusted to compensate for the degree of polarization. FIG. 18 includes an optional operation 1812 for compensating for the degree of polarization. The degree of polarization of expected light sources may be stored in the star catalog 222 (FIG. 2). Thus, embodiments of the present invention are structurally different than the Chu device, and methods of the present invention operate differently than Chu's device.

General Case of Three Poxels with Differing Orientations

This section contain mathematical explanations of processing of signals from three differently-oriented poxels, i.e., each poxel is oriented differently than the other two poxels, according to embodiments of the present invention. The three-poxel polarization-sensitive light sensor 2000 of FIG. 20 may be used to generate such signals. This section contains equations and text describing mathematical processing of the signals to calculate a direction, from the poxels, to a star or other light source. Equations (5) to (16) and their accompanying text assume irradiance of the star or other light source is known. For example, if one or more stars are to be used for navigation, published data about their irradiances may be stored in the star catalog 222 (FIG. 2). Equations (17) to (31) and their accompanying text assume the irradiance is not known a priori.

Figure 21:
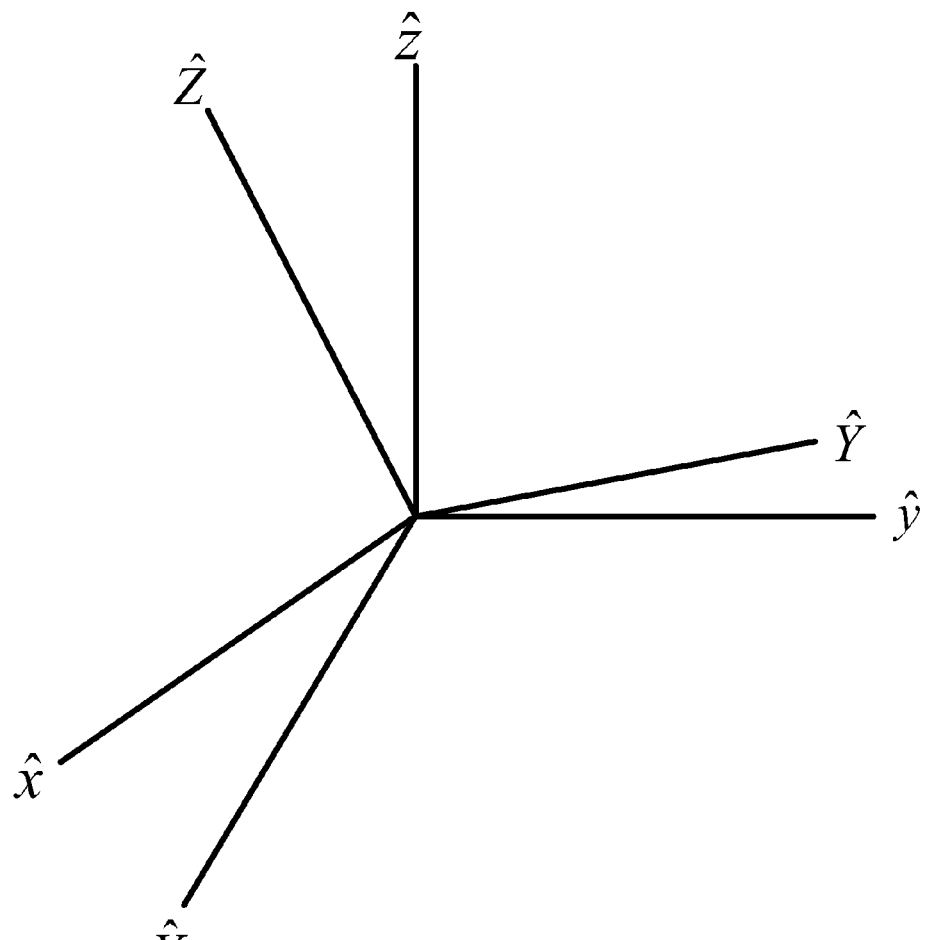
FIG. 21 is a schematic diagram of two hypothetical sets of coordinate axes, one set being rotated an arbitrary amount with respect to the other.

Consider a case of three poxels, whose sensitive elements lay along the x and y axes of their respective coordinate systems. The three poxels' orientations are related through rotation angles $\alpha$, $\beta$ and $\gamma$, which are described with respect to two sets of coordinate axes shown in FIG. 21. An initial coordinate or axis is denoted without a prime, for example x. A first rotated coordinate or axis is denoted by a single prime, for example x'. A second rotated coordinate or axis is denoted by a double prime, for example x". A third rotated coordinate or axis is denoted by a capital letter, for example X. The rotation angles $\alpha$, $\beta$ and $\gamma$ are defined as follows:
$\alpha$=angle about z
$\beta$=angle between z and $\hat{z}'$ about $\hat{x}'$
$\gamma$=angle about $\hat{z}''$
The rotation matrix from x, y, z to X, Y, Z is:

$$\mathbb{R} = \begin{bmatrix} C_1 C_2 & C_1 S_2 S_3 - C_3 S_1 & S_1 S_3 + C_1 C_3 S_2 \\ C_2 S_1 & C_1 C_3 + S_1 S_2 S_3 & C_3 S_1 S_2 - C_1 S_3 \\ -S_2 & C_2 S_3 & C_2 C_3 \end{bmatrix} \quad (2)$$

where 1, 2 and 3 represent angles $\alpha$, $\beta$ and $\gamma$, and S and C represent sine and cosine. So, for example, $S_2 = \sin(\beta)$. In general:

$$\mathbb{A} \equiv \begin{bmatrix} a_{11} & a_{12} & a_{13} \\ a_{21} & a_{22} & a_{23} \\ a_{31} & a_{32} & a_{33} \end{bmatrix} \quad (3)$$

Figure 22:
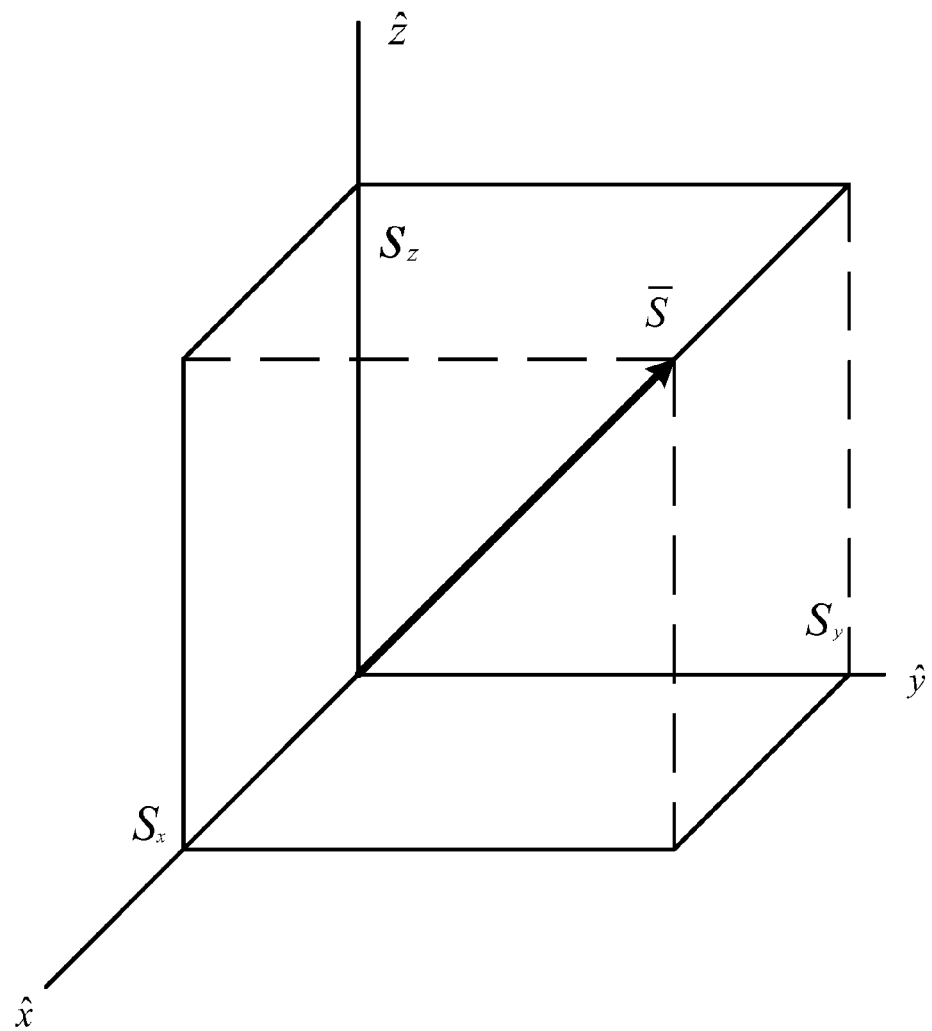
FIG. 22 is a schematic diagram of a hypothetical Poynting vector and a set of coordinate axes.

We take the incident plane wave as unpolarized and represent it as a vector $\overline{S}$, which is the negative time-averaged Poynting vector with units of watts/meter². See FIG. 22. We wish to find all three components of $\overline{S}$ by measuring only voltages on the sensitive poxel elements lying parallel to x and y in their respective coordinate frames. The poxels are calibrated such that incident unpolarized light along $\hat{z}$ yields voltages $V_x$ and $V_y$, where:

$$V_x = A \cdot S_z \text{ and } V_y = A \cdot S_z \quad (4)$$

where A is a calibration constant with units of volts·meter²·watts⁻¹. In general, for $\overline{S}$ not parallel to the z axis, we have:

$$V_x = |\overline{S} \times \hat{x}| = \sqrt{S_y^2 + S_z^2} = \sqrt{S - S_x^2} \quad (5)$$

and similarly for $V_y$:

$$V_y = \sqrt{S_x^2 + S_z^2} = \sqrt{S - S_y^2} \quad (6)$$

$V_x$ and $V_y$ are the voltages for the poxel elements aligned with the x and y axes.
$\overline{S}$ is the negative time-averaged Poynting vector.
$\hat{x}$ denotes a unit vector pointing along the positive x direction.
The | | is the magnitude of a vector.
A vector cross product is denoted by a cross ("×") symbol, as in $\overline{S} \times \hat{x}$.
Since the magnitude of S does not change in any coordinate system, we have:

$$S = S' = S'' \quad (7)$$

In general we have:

$$S_i^2 = S^2 - \frac{V_i^2}{A^2} \quad (8)$$

for all coordinate systems, $V_i$ being the voltage along axis z', and $S_i$ being the component of $\overline{S}$ along axis z'. We restrict ourselves to:

$$S_z, S_{z'} \text{ and } S_{z''} > 0 \quad (9)$$

i.e., incident light is above the plane of a poxel.

$$|\overline{S}| = S = S_x^2 + S_y^2 + S_z^2 = S_{x'}^2 + S_{y'}^2 + S_{z'}^2 = S_{x''}^2 + S_{y''}^2 + S_{z''}^2 \quad (10)$$

What is known is all poxel voltages $V_x$, $V_y$, $V_x'$, $V_y'$, $V_x''$ and $V_y''$ and all rotation angles $\alpha$, $\beta$ and $\gamma$. What is wanted is the time-averaged Poynting vector, $\overline{S}$.

Combining equations (8) and (10) and assuming S is known, i.e., the star irradiance, we have:

$$S^2 - \frac{V_x^2}{A^2} + S^2 - \frac{V_y^2}{A^2} + S_z^2 = S, \text{ which yields } S_z. \quad (11)$$

$$S^2 - \frac{V_{x'}^2}{A^2} + S^2 - \frac{V_{y'}^2}{A^2} + S_{z'}^2 = S, \text{ which yields } S_{z'}. \quad (12)$$

and similarly for $S_{z''}$ (13)

So, now we know $S_z$, $S_{z'}$ and $S_{z''}$.
Let the rotation matrix from the x, y and z to x', y' and z' be $\mathbb{R}$ and $\mathbb{V}$ for x", y" and z". So, in general:

$$\overline{S}' = \mathbb{R} \overline{S} \Rightarrow S_{z'} = R_{31} S_x + R_{33} S_y + R_{33} S_z \quad (14)$$

We choose our rotation angles for poxel 2 such that $\beta = 0$ and for poxel 3 such that $\gamma = 0$. This yields:

$$S_{z'} = R_{32} S_y R_{33} S_z, \text{ which yields } S_y; \text{ and} \quad (15)$$

$$S_{z''} = V_{31} S_x + V_{32} S_y + V_{33} S_z, \text{ which yields } S_x. \quad (16)$$

Therefore, equations (11) to (16) give us $\bar{S}$, with prior knowledge of S, the star irradiance. Knowing $\bar{S}$ gives us the direction angles to the star producing $\bar{S}$.

Now, assume S is not known a priori. From equations (8) and (10):

$$S^2 - \frac{V_x^2}{A^2} + S^2 - \frac{V_y^2}{A^2} + S_z^2 = S \quad (17)$$

$$S^2 - \frac{V_{x'}^2}{A^2} + S^2 - \frac{V_{y'}^2}{A^2} + S_{z'}^2 = S \quad (18)$$

Subtracting (18)-(17) yields:

$$S_z^2 = S_{z'}^2 + \frac{1}{A^2}[V_x^2 + V_y^2 - V_{x'}^2 - V_{y'}^2] = S_{z'}^2 + \text{Term 1} \quad (19)$$

$$S_z^2 = [R_{31}S_x + R_{32}S_y + R_{33}S_z]^2 + \text{Term 1}. \quad (20)$$

Similarly for $S_{z''}$:

$$S_z^2 = [V_{31}S_x + V_{32}S_y + V_{33}S_z]^2 + \text{Term 2}; \quad (21)$$

$$\text{Term 2} = \frac{1}{A^2}[V_x^2 + V_y^2 - V_{x''}^2 - V_{y''}^2]$$

Since $R_{31}=0$ ($\beta=0$):

$$S_z^2 = [R_{32}S_y + R_{33}S_z]^2 + \text{Term 1}. \quad (22)$$

$$S_z^2 = R_{32}^2 S_y^2 + R_{33}^2 S_z^2 + 2R_{32}R_{33}S_y S_z + \text{Term 1} \quad (23)$$

From equations (8) and (10):

$$S_j^2 + S_k^2 = \frac{V_i^2}{A^2} \quad (24)$$

where i, j and k are an ordered triplet. So:

$$S_y^2 = \frac{V_x^2}{A^2} - S_z^2 \quad (25)$$

which yields from (23) and (24):

$$S_z^2 = R_{32}^2\left[\frac{V_x^2}{A^2} - S_z^2\right] + R_{33}^2 S_z^2 + 2R_{32}R_{33}\left[\frac{V_x^2}{A^2} - S_z^2\right]S_z + \text{Term 1} \quad (26)$$

This can be solved numerically to yield $S_z$, where $S_z>0$, but may in general have two solutions. Now, from (21) and since $V_{32}=0$ ($\gamma=0$):

$$S_z^2 = [V_{31}S_x + V_{33}S_z]^2 + \text{Term 2} \quad (27)$$

From (24) we have:

$$S_x = \sqrt{\frac{V_y^2}{A^2} - S_z^2} \quad (28)$$

So:

$$S_z^2 = V_{31}^2 S_x^2 + V_{33}^2 S_z^2 + 2V_{31}V_{33}S_x S_z + \text{Term 2} \quad (29)$$

$$S_z^2 = V_{31}^2\left[\frac{V_y^2}{A^2} - S_z^2\right] + V_{33}^2 S_z^2 + 2V_{31}V_{33}S_z\sqrt{\frac{V_y^2}{A^2} - S_z^2} + \text{Term 2} \quad (30)$$

Now solve numerically for $S_z$ and pick a matching solution to (26). Now $S_z$ is known. Now solve for $S_x^2$ and $S_y^2$ using:

$$S_x^2 = \frac{V_y^2}{A^2} - S_z^2 \text{ and } S_y^2 = \frac{V_x^2}{A^2} - S_z^2 \quad (31)$$

Then compute:

$$S^2 = S_x^2 + S_y^2 + S_z^2 \quad (32)$$

to yield S, knowing S>0.

Now use (12) to get $S_z$, which is >0.
Then use (15) to get $S_y$.
Then use (13) to get $S_{z'}$, which is >0.
Then use (16) to get $S_x$.

Therefore, we have computed $\bar{S}$ with no prior knowledge of the star's irradiance S.

Although star trackers that use navigational stars have been described, other light-emitting or light-reflecting space objects can be used for navigation. For example, most artificial satellites have predictable orbits or other trajectories and can, therefore, be used instead of, or in addition to, stars for navigation. This concept was originally proposed by The Charles Stark Draper Laboratory, Inc. and named Skymark. The star catalog 222 (FIG. 2) can include ephemeris data about artificial satellites to facilitate Skymark-type navigation using an embodiment of star trackers disclosed herein.

A star tracker, as described herein, may be used in parallel with another navigation system, such as a GPS, as a backup, in case an on-board GPS receiver fails or the GPS is compromised. The star tracker may be used to verify a GPS-determined position and take over if the verification fails.

Although embodiments of the present invention have been described in the contexts of star trackers, methods and apparatus described herein may be used in other contexts, such as autocollimators or other situations in which a need exists to measure an angle of incidence.

While the invention is described through the above-described exemplary embodiments, modifications to, and variations of, the illustrated embodiments may be made without departing from the inventive concepts disclosed herein. Furthermore, disclosed aspects, or portions of these aspects, may be combined in ways not listed above and/or not explicitly claimed. Accordingly, the invention should not be viewed as being limited to the disclosed embodiments.

Although aspects of embodiments may have been described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software, also referred to as instruction codes or program codes), hardware (such as combinatorial logic, Application Specific Integrated Circuits (ASICs), Field-Programmable Gate Arrays (FPGAs) or other hardware), firmware or combinations thereof.

Some embodiments have been described as including a processor-driven controller. These and other embodiments may be implemented by a processor executing, or controlled by, instructions stored in a memory to perform functions described herein. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

What is claimed is:

1. A method for determining a direction to a source of unpolarized electromagnetic radiation, the method comprising:
   exposing a first sensor to the unpolarized electromagnetic radiation, the first sensor being primarily sensitive to electromagnetic radiation polarized along a first axis and configured to generate a first signal proportional to a magnitude of the unpolarized electromagnetic radiation detected by the first sensor;
   exposing a second sensor to the unpolarized electromagnetic radiation, the second sensor being primarily sensitive to electromagnetic radiation polarized along a second axis, different than the first axis, and configured to generate a second signal proportional to a magnitude of the unpolarized electromagnetic radiation detected by the second sensor;
   determining a ratio of the first signal to the second signal; and
   using the ratio to calculate an angle of incidence of the unpolarized electromagnetic radiation.

2. A method according to claim 1, wherein exposing the first and second sensors to the unpolarized electromagnetic radiation comprises exposing the first and second sensors to unpolarized electromagnetic radiation from a star.

3. A method according to claim 1, further comprising:
   automatically accessing a database that stores a star catalog; and
   automatically calculating a location in space based at least in part on the angle of incidence and information in the star catalog.

4. A method according to claim 1, further comprising:
   automatically accessing a database that stores a star catalog; and
   automatically calculating a direction to a star and identity of the star, based at least in part on the angle of incidence and information in the star catalog.

5. A method according to claim 1, wherein:
   exposing the first sensor to the unpolarized electromagnetic radiation comprises exposing a first array of nanoantennas to the unpolarized electromagnetic radiation, wherein all nanoantennas of the first array of nanoantennas are similarly oriented so as to be primarily sensitive to electromagnetic radiation polarized along the first axis, and all the nanoantennas of the first array of nanoantennas are electrically coupled together to generate the first signal; and
   exposing the second sensor to the unpolarized electromagnetic radiation comprises exposing a second array of nanoantennas to the unpolarized electromagnetic radiation, wherein all nanoantennas of the second array of nanoantennas are similarly oriented so as to be primarily sensitive to electromagnetic radiation polarized along the second axis, and all the nanoantennas of the second array of nanoantennas are electrically coupled together to generate the second signal.

6. A method according to claim 1, further comprising:
   storing a value representing the second signal;
   tilting the second sensor;
   exposing the tilted second sensor to the unpolarized electromagnetic radiation; and
   generating a third signal proportional to a magnitude of the unpolarized electromagnetic radiation detected by the tilted second sensor; wherein:
   determining the ratio of the first signal to the second signal and using the ratio to calculate the angle of incidence of the unpolarized electromagnetic radiation comprises using the first signal, the stored value representing the second signal and the third signal to calculate the angle of incidence of the unpolarized electromagnetic radiation.

7. A method according to claim 1, further comprising compensating for a degree to which the unpolarized electromagnetic radiation is polarized.

8. A method according to claim 1, wherein:
   exposing the first sensor comprises providing a sensor comprising a plurality of first elements, each element of the plurality of first elements being configured to generate a signal proportional to electromagnetic radiation incident upon the element;
   exposing the second sensor comprises providing a sensor comprising a plurality of second elements, each element of the plurality of second elements being configured to generate a signal proportional to electromagnetic radiation incident upon the element; the method further comprising:
   automatically adjusting sensitivity of the plurality of first elements, such that each element of the plurality of first elements is preferentially sensitive to incident electromagnetic radiation having a first polarization; and
   automatically adjusting sensitivity of the plurality of second elements, such that each element of the plurality of second elements is preferentially sensitive to incident electromagnetic radiation having a second polarization, different than the first polarization.

9. A method according to claim 8, wherein automatically adjusting the sensitivity of the plurality of first elements and the plurality of second elements comprises automatically adjusting the sensitivity of the plurality of first elements and automatically adjusting the sensitivity of the plurality of second elements, such that the first polarization is at least approximately perpendicular to the second polarization.

10. A star tracker for determining a direction to a source of unpolarized electromagnetic radiation, the star tracker comprising:
   a plurality of electromagnetic radiation sensors, wherein each sensor of the plurality of electromagnetic radiation sensors is primarily sensitive to electromagnetic radiation polarized along a different axis and generates a proportional signal in proportion to a magnitude of unpolarized electromagnetic radiation detected by the sensor;

a ratio detector that receives the proportional signals generated by the plurality of electromagnetic radiation sensors and generates a ratio signal that represents a ratio of at least two of the proportional signals; and an angle of incidence calculator that receives the ratio signal and generates therefrom a signal representing an angle of incidence of the unpolarized electromagnetic radiation.

11. A star tracker according to claim 10, further comprising:
a database that stores a star catalog; and
a navigation calculator that receives the angle of incidence signal, accesses the star catalog and calculates an orientation or location in space based at least in part on the angle of incidence signal and information in the star catalog.

12. A star tracker according to claim 11, wherein:
the star catalog includes information about a degree of polarization of electromagnetic radiation from at least one star; and
at least one of the ratio detector and the incidence angle calculator uses the information about the degree of polarization of the electromagnetic radiation from the at least one star to compensate at least one of the ratio signal and the signal representing an angle of incidence.

13. A star tracker according to claim 10, wherein each sensor of the plurality of electromagnetic radiation sensors comprises an array of similarly oriented nanoantennas, all oriented so as to be primarily sensitive to electromagnetic radiation polarized along the axis of the sensor and all electrically coupled together to generate the proportional signal for the sensor.

14. A star tracker according to claim 10, wherein:
at least one sensor of the plurality of electromagnetic radiation sensors is tiltable; the star tracker further comprising:
a motor mechanically coupled to the at least one tiltable sensor, so as to tilt the at least one sensor from a first plane to a second plane; and wherein:
the at least one tiltable sensor generates at least a first portion of the proportional signal, based on a magnitude of unpolarized electromagnetic radiation detected by the at least one tiltable sensor while the at least one tiltable sensor is in the first plane, and the at least one tiltable sensor generates a second portion of the proportional signal, based on a magnitude of unpolarized electromagnetic radiation detected by the at least one tiltable sensor while the at least one tiltable sensor is in the second plane; and
the ratio detector generates at least a first portion of the ratio signal based on the first portion of the proportional signal, and the ratio detector generates at least a second portion of the ratio signal based on the second portion of the proportional signal.

15. A computer program product for determining a direction to a source of unpolarized electromagnetic radiation, the computer program product comprising a non-transitory computer-readable medium having computer readable program code stored thereon, the computer readable program code, when executed by a processor, causes the processor to:
receive a first signal from a first sensor exposed to the unpolarized electromagnetic radiation, the first sensor being primarily sensitive to electromagnetic radiation polarized along a first axis and configured to generate the first signal proportional to a magnitude of the unpolarized electromagnetic radiation detected by the first sensor;
receive a second signal from a second sensor exposed to the unpolarized electromagnetic radiation, the second sensor being primarily sensitive to electromagnetic radiation polarized along a second axis, different than the first axis, and configured to generate the second signal proportional to a magnitude of the unpolarized electromagnetic radiation detected by the second sensor;
determine a ratio of the first signal to the second signal; and
use the ratio to calculate an angle of incidence of the unpolarized electromagnetic radiation.

16. A computer program product according to claim 15, wherein the computer readable program code further causes a processor to:
automatically access a database that stores a star catalog; and
automatically calculate a location in space based at least in part on the angle of incidence and information in the star catalog.

17. A computer program product according to claim 15, wherein:
the first sensor is exposed to the unpolarized electromagnetic radiation by exposing a first array of nanoantennas to the unpolarized electromagnetic radiation, wherein all nanoantennas of the first array of nanoantennas are similarly oriented so as to be primarily sensitive to electromagnetic radiation polarized along the first axis, and all the nanoantennas of the first array of nanoantennas are electrically coupled together to generate the first signal; and
the second sensor is exposed to the unpolarized electromagnetic radiation by exposing a second array of nanoantennas to the unpolarized electromagnetic radiation, wherein all nanoantennas of the second array of nanoantennas are similarly oriented so as to be primarily sensitive to electromagnetic radiation polarized along the second axis, and all the nanoantennas of the second array of nanoantennas are electrically coupled together to generate the second signal.

18. A computer program product according to claim 15, wherein the computer readable program code further causes a processor to:
store a value representing the second signal;
tilt the second sensor;
expose the tilted second sensor to the unpolarized electromagnetic radiation; and
generate a third signal proportional to a magnitude of the unpolarized electromagnetic radiation detected by the tilted second sensor; wherein:
determine the ratio of the first signal to the second signal and use the ratio to calculate the angle of incidence of the unpolarized electromagnetic radiation comprises using the first signal, the stored value representing the second signal and the third signal to calculate the angle of incidence of the unpolarized electromagnetic radiation.

19. A computer program product according to claim 15, wherein the computer readable program code further causes a processor to compensate for a degree to which the unpolarized electromagnetic radiation is polarized.

20. A star tracker for determining a direction to a source of unpolarized electromagnetic radiation, the star tracker comprising:

a first electromagnetic radiation sensor configured to generate a first signal proportional to a first polarization component of unpolarized electromagnetic radiation impinging on the first electromagnetic radiation sensor;

a second electromagnetic radiation sensor configured to generate a second signal proportional to a second polarization component of unpolarized electromagnetic radiation impinging on the second electromagnetic radiation sensor, the second polarization component being oriented differently than the first polarization component;

a ratio detector that receives the first and second signals and generates a ratio signal that represents a ratio of the first signal to the second signal; and an angle of incidence calculator that receives the ratio signal and generates therefrom a signal representing an angle of incidence of the unpolarized electromagnetic radiation.

21. A star tracker, comprising:

a plurality of electromagnetic radiation sensors, each sensor of the plurality of electromagnetic radiation sensors configured to generate a respective signal in proportion to magnitude of a different polarization component of unpolarized electromagnetic radiation impinging on the sensor; and a ratio detector configured to receive the signals generated by the plurality of electromagnetic radiation sensors and calculate an angle of incidence of the unpolarized electromagnetic radiation.

* * * * *